United States Patent
Hosseini et al.

(10) Patent No.: US 11,003,045 B2
(45) Date of Patent: May 11, 2021

(54) PHASE FRONT SHAPING IN ONE AND TWO-DIMENSIONAL OPTICAL PHASED ARRAYS

(71) Applicant: ANALOG PHOTONICS LLC, Boston, MA (US)

(72) Inventors: Ehsan Hosseini, Boston, MA (US); Michael Watts, Hingham, MA (US)

(73) Assignee: Analog Photonics LLC, Boston, MA (US)

( * ) Notice: Subject to any disclaimer, the term of this patent is extended or adjusted under 35 U.S.C. 154(b) by 617 days.

(21) Appl. No.: 15/885,647

(22) Filed: Jan. 31, 2018

(65) Prior Publication Data

US 2019/0056634 A1    Feb. 21, 2019

Related U.S. Application Data

(60) Provisional application No. 62/452,838, filed on Jan. 31, 2017.

(51) Int. Cl.
   *G02F 1/29*    (2006.01)

(52) U.S. Cl.
   CPC ........ *G02F 1/292* (2013.01); *G02F 2201/305* (2013.01); *G02F 2203/24* (2013.01)

(58) Field of Classification Search
   None
   See application file for complete search history.

(56) References Cited

U.S. PATENT DOCUMENTS

| | | | |
|---|---|---|---|
| 2003/0202731 A1* | 10/2003 | Ionov | H01Q 3/2676 385/15 |
| 2014/0376001 A1* | 12/2014 | Swanson | G01B 9/02004 356/479 |

OTHER PUBLICATIONS

J. Zhou, J. Sun, A. Yaacobi, C. V. Poulton, and M. R. Watts, "Design of 3D Hologram Emitting Optical Phased Arrays," in Advanced Photonics 2015, OSA Technical Digest (online) (Optical Society of America, 2015), paper IT4A.7.

* cited by examiner

*Primary Examiner* — Michelle R Connelly
(74) *Attorney, Agent, or Firm* — Young Basile Hanlon & MacFarlane, P.C.

(57) ABSTRACT

Aspects of the present disclosure describe optical phased array structures and devices in which hyperbolic phase envelopes are employed to create focusing and diverging emissions in one and two dimensions. Tuning the phase fronts moves focal point spot in depth and across the array. Grating emitters are also used to emit light upward (out of plane). Adjusting the period of the gratings along the light propagation direction results in focusing the light emitted from the gratings. Changes in the operating wavelengths employed moves the focal spot along the emitters.

24 Claims, 26 Drawing Sheets

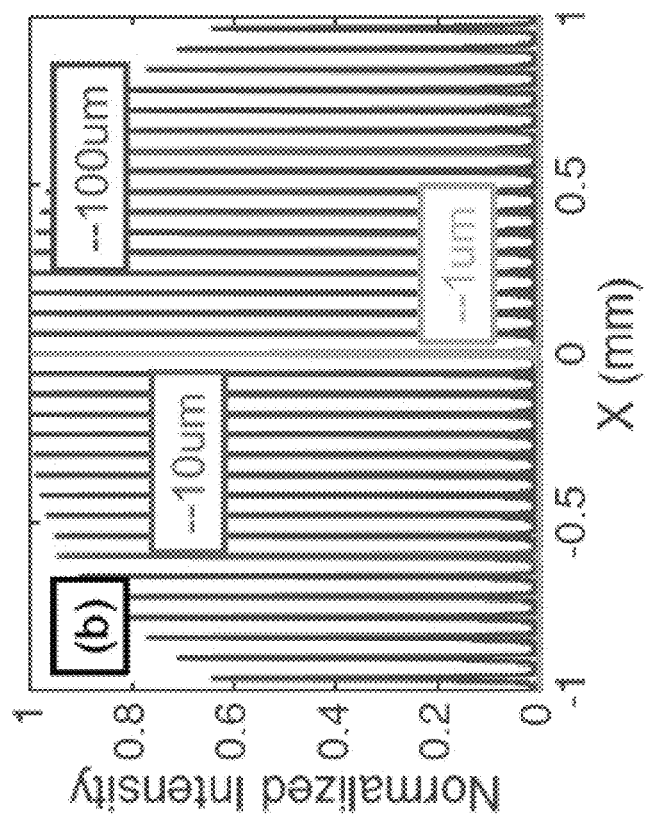
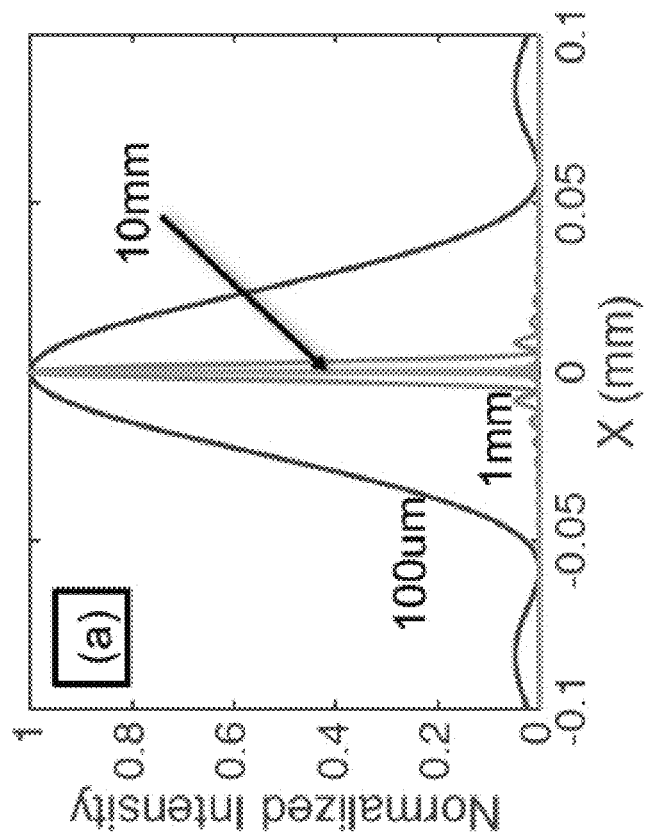
FIG. 11(A)
FIG. 11(B)

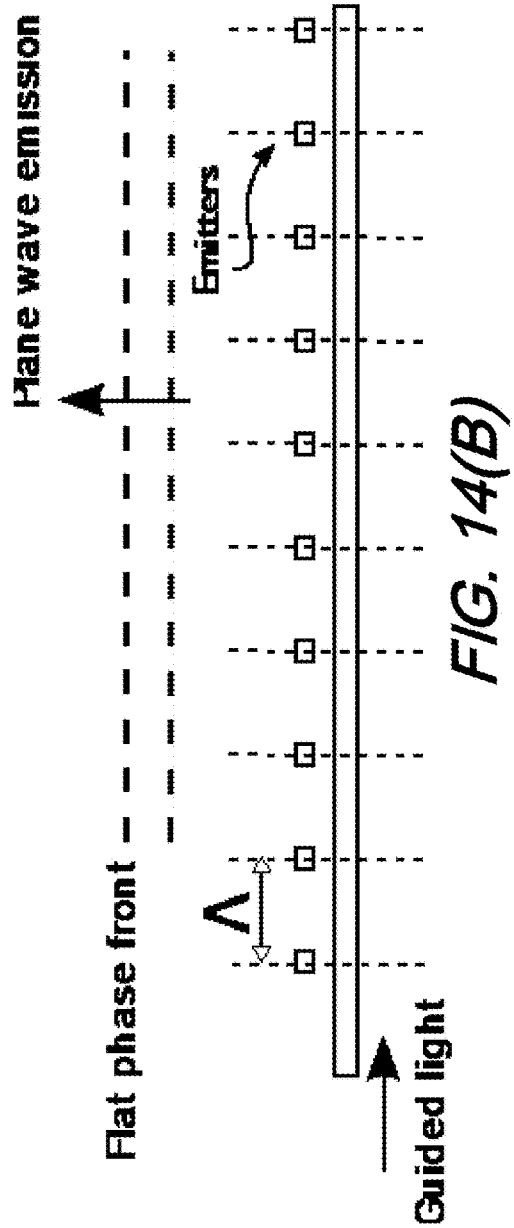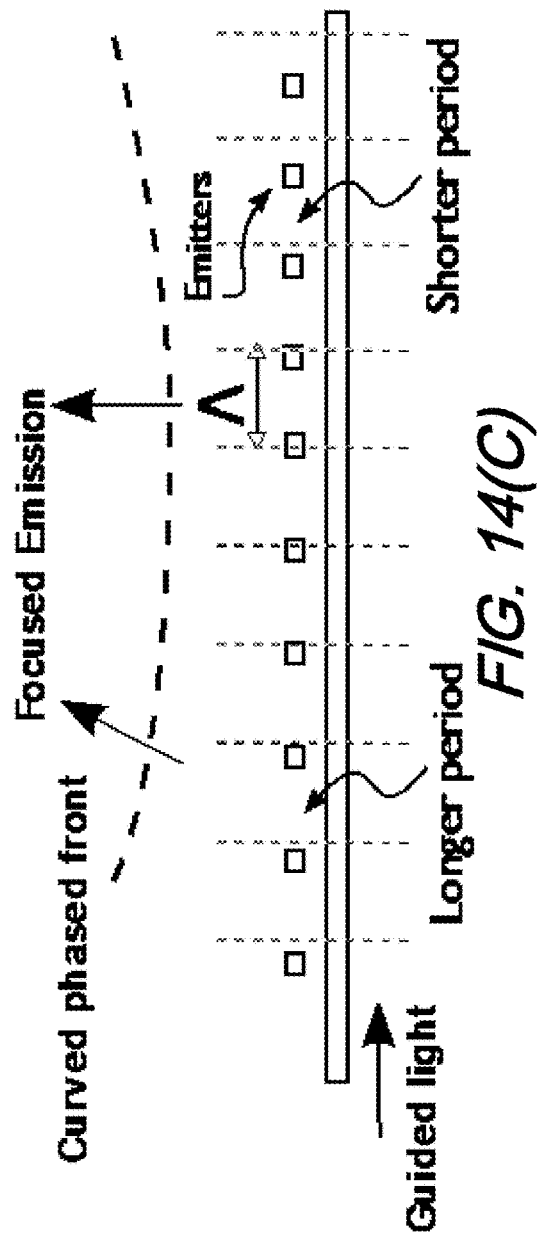
FIG. 14(B)
FIG. 14(C)

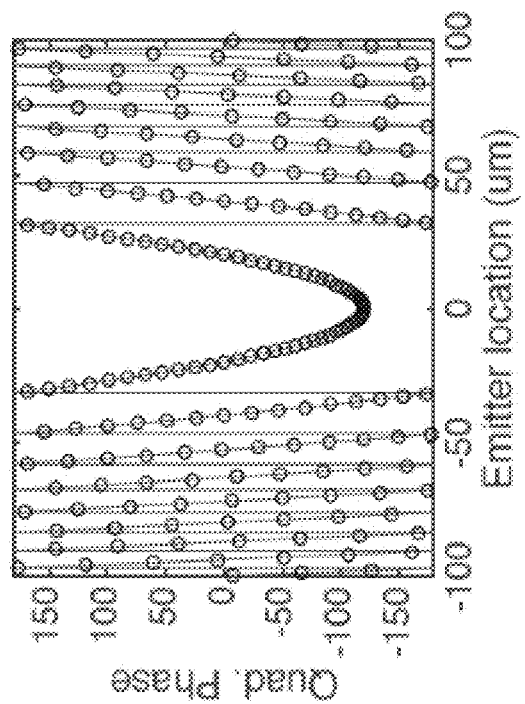
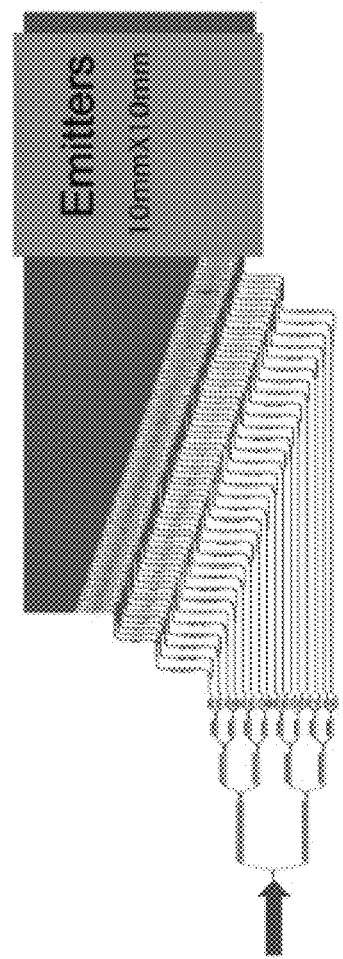
FIG. 17(A)
FIG. 17(B)

PHASE FRONT SHAPING IN ONE AND TWO-DIMENSIONAL OPTICAL PHASED ARRAYS

CROSS REFERENCE TO RELATED APPLICATIONS

This application claims the benefit of U.S. Provisional Patent Application Ser. No. 62/452,838 filed 31 Jan. 2017 the entire contents of which are incorporated by reference as if set forth at length herein.

STATEMENTS AS TO FEDERALLY SPONSORED RESEARCH

This application was made with government support under the following contract: Defense Department, Defense Advanced Research Projects Agency (DARPA) Contract No. W911NF-15--P-0029. The government has certain rights in the invention.

TECHNICAL FIELD

This disclosure relates generally to the focusing and steering of electromagnetic radiation. More particularly, it relates to methods, systems, structures, and devices that include phased arrays and dynamically focus radiation beams to a desired focal spot depth and steer that focal spot in three dimensions without lenses or moving mechanical parts.

BACKGROUND

As is known, the ability to precisely focus radiation beams at a desired focal spot is of considerable importance to many contemporary technologies including—but not limited to—imaging, ranging, sensing, measuring, detecting, and communications which—in turn—find widespread applicability in scientific and medical instruments and systems, vehicular safety and control, robotic navigation, and line of sight communications. Given the importance and widespread contemporary applicability, systems, methods, and structures that facilitate the precise focus of radiation beams at a desired focal spot—and while eliminating moving mechanical parts from such systems, methods, and structures—would represent a welcome addition to the art.

SUMMARY

An advance in the art is made according to aspects of the present disclosure directed to optical phased array structures and devices in which hyperbolic phase envelopes are employed to create focusing and diverging emissions in one and two dimensions. Tuning the phase fronts moves focal point spot in depth and across the array and grating emitters are also used to emit light upward (out of plane). Adjusting the period of the gratings along the light propagation direction results in focusing the light emitted from the gratings while changes in the operating wavelengths employed moves the focal spot along the emitters.

Viewed from one aspect, optical structures according to the present disclosure include an optical source that generates light; an array of phase-controlled emitters that emit the generated light; and an optical distribution network optically connecting the optical source to the array of phase-controlled emitters; wherein such structures are operated by adjusting the array of phase-controlled emitters such that a hyperbolic delay function is imposed upon the array of phase-controlled emitters. Operationally, such structures may advantageously be adjusted such that the travel time from the source to a single common focal point is substantially the same for all emitted light.

In sharp contrast to the prior art, optical structures according to the present disclosure advantageously provide optical phased arrays exhibiting the ability to generate dynamically adjustable, focused or diffused emission patters that may be further adjusted over three-dimensions.

BRIEF DESCRIPTION OF THE DRAWING

A more complete understanding of the present disclosure may be realized by reference to the accompanying drawing in which:

FIG. 11(A) and FIG. 11(B) are plots of Normalized Intensity vs X and FIG. 11(C) is a plot of Intensity vs. Angle illustrating: FIG. 11(A) the effect of array size on focal spot size showing the focal radius is reduced as array size increased from 100 µm to 10 mm; and FIG. 11(B) showing that as separation between emitters is reduced side bands are suppressed while FIG. 11(C) shows sidelobes according to aspects of the present disclosure;

12(A) of Intensity vs. Depth illustrating: FIG. 12(A) the intensity pattern of a 10 mm-sized array with the focal length set at 10 mm in which the focus depth is 10 µm and the focal spot size is 4 µm; and FIG. 12(B) of Normalized Intensity vs. Depth showing the depth of focus depends on the ratio f/L in which the normalized intensity of two arrays with L=1 mm, f=1 mm, and L=10 mm, f=10 mm overlaid according to aspects of the present disclosure;

FIG. 13(A) implementing efficient vertical emitters based on quarter-wave shifted dipole antennas; FIG. 13(B) a second silicon nitride layer as sacrificial layer and used as upward emission; and FIG. 13(C) emission pattern of the optimized grating at 633 nm when the separation between two nitride layers is 70 nm, grating period is 410 nm and top grating is slightly (40 nm) is offset from the bottom grating mode according to aspects of the present disclosure;

FIG. 14(A), FIG. 14(B), and FIG. 14(C) are schematics illustrating focusing effect in the grating resulting from different grating period(s) according to aspects of the present disclosure;

FIG. 15(A) a plot of Grating Period vs. Location showing the period of a grating gradually modified along a waveguide to maintain radiation pattern pointing toward a focus point; FIG. 15(B) a schematic illustrating a change in wavelength changes Bragg condition at all points along the waveguide and steers the focal spot along the waveguide; and FIG. 15(C) a plot of Depth vs. Location illustrating the simulation of steering effect that as the wavelength of the laser is changed from 620 to 646 nm the focal spot moves across 1 mm on the focal plane; FIG. 15(D) plot showing focal distance vs. wavelength, and FIG. 15(E) illustrates focal depth if same phase is employed with a special filter (Iris) as a filter according to aspects of the present disclosure;

FIG. 17(A) is a schematic illustrating a one-dimensional phased array structure operable to provide voltage-controlled sweeps; and FIG. 17(B) a plot of Quad. Phase vs. Emitter Location illustrating the phase pattern required for individual elements in a focusing (quadratic) phase front is desired and by placing elements (shown as circles) farther apart one down-samples the quadratic phase function which leads to imperfect focusing according to aspects of the present disclosure;

Figure 1:
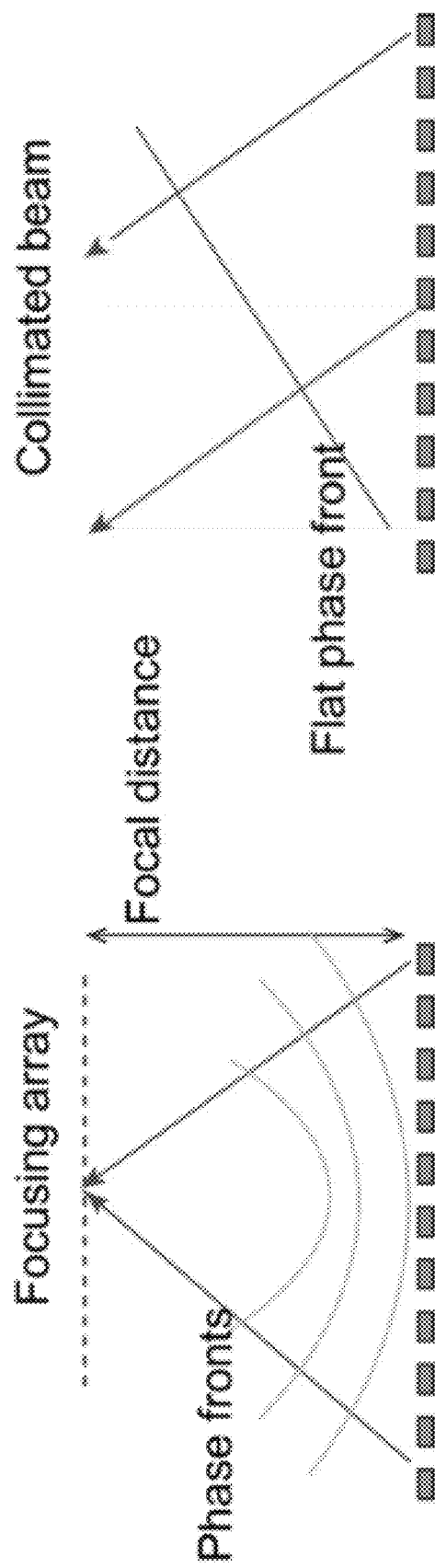
FIG. 1 is a schematic illustrating: (Left) a curved phase front producing radiation emission focused at a single point; and (Right) a flat phase front producing collimated radiation emission beams.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Lastly, it is noted that while the specific discussion and examples provided throughout this disclosure are predominately optical in nature, the disclosure is not so limited. More specifically, the principles disclosed herein are applicable to other electromagnetic emissions and not just those in the optical range(s) of the electromagnetic spectrum.

Unless otherwise explicitly specified herein, the FIGs comprising the drawing are not drawn to scale.

By way of some further background we begin by noting that the ability to generate a diffraction limited focusing beam according to the present disclosure may advantageously eliminate the need for conventional focusing structures including moving mechanical parts and associated lenses. As is known and appreciated by those skilled in the art, conventional systems and structures for such important applications as medical imaging—among others—oftentimes employ large lenses, moving mirrors, and complex moving mechanical apparatus to steer electromagnetic radiation—and in particular, light—towards a tissue in three dimensions. Significantly, systems, methods and structures according to the present disclosure provide for the quick and easy change in focal length and location(s) of spots through the effect of electronic control without requiring moving mechanical parts and/or lenses as are conventionally required.

Photonic phased arrays have recently attracted considerable attention due—in part—to their widespread applicability to a number of important applications as well as recent development and utilization of advanced lithography and etching techniques originally developed for complementary metal-oxide-semiconductor (CMOS) processes and structures. As will become apparent to those skilled in the art, systems, methods and structures according to aspects of the present disclosure may advantageously employ large scale phased arrays having thousands (or more) emitter elements in which the phase and/or amplitude of elements in one or two dimensions is selectively controlled to generate electromagnetic emissions that coherently interferes with itself thereby creating complex patterns (points) at chosen observation distance(s). Of further advantages, such points may be in a near-field (distance in the order of the wavelength), in the far-field (Fraunhofer diffraction), and in Fresnel diffraction range (mid-range).

Turning now to FIG. 1, there is shown a schematic of a phased array antenna arrangement illustrating the focusing of radiation at a single point through the effect of a curved phase front (left) and the generation of collimated beam(s) through the effect of a flat phase front (right) according to aspects of the present disclosure.

As may be observed from that figure, an array of phased array antenna elements is shown emitting coherent electromagnetic radiation. As is known by those skilled in the art and as used herein, a phased array is an array of antennae grouped together to form a single antenna. A beam produced by the phased array antenna may be steered—without physically moving the antenna—by adjusting phase(s) of signals applied to the individual antennae.

In the simple configurations illustrated in FIG. 1, each phase array antenna element is spaced apart from its neighboring elements by (ideally) less than half the wavelength emitted, (emitter and/or emitter/phase shifter(s)) emit coherent electromagnetic radiation (e.g., optical, microwave, etc.), and are phased/configured in such that the elements combine constructively at a desired focal point without requiring an external lens or movable mechanical components. Noting that a wave originating at a distance r falls behind in phase according to:

$$\Delta\phi = -(2\pi/\lambda_o) \times n \times r \quad (1)$$

in which $\lambda_o$ is the wavelength of the wave in vacuum ($\lambda_o = c/f$), and n is the refractive index of the propagation material. Accordingly, if one desires that a number of waves exhibiting the same frequency and emanating from several points in space are to meet at a focal point and add up (interfere constructively), the phase of each emitter ($\psi_i$) should be corrected by an amount defined by:

$$\psi_i = (2\pi/\lambda_0) \times n \times r_i \quad (2)$$

in which $r_i$ is the distance of the individual emitter to the focal point. Working backwards from the focal point at a fixed distance, the distance between each emitter and the observation point—its phase retardation changes according to the Pythagorean theorem.

Figure 2:
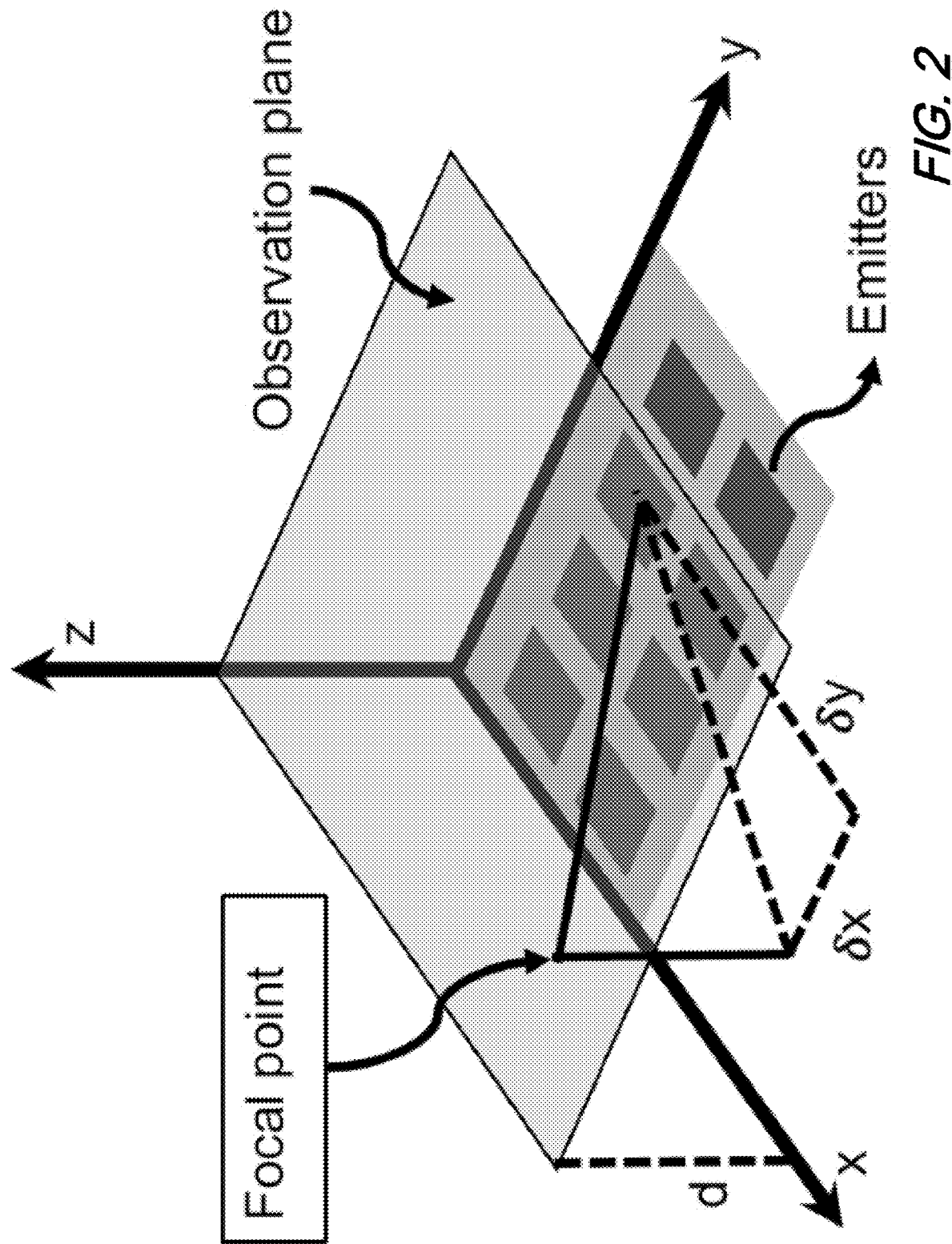
FIG. 2 is a schematic illustrating distance from a focal point to an individual emitter determining amount of phase pre-adjustment(s) as determined by Pythagorean theorem according to aspects of the present disclosure.

This is illustratively shown FIG. 2, where it may be observed that the distance from the focal point to each individual emitter determines the amount of phase pre-adjustment. Shown further in that figure is that this distance may be conveniently determined by the Pythagorean theorem as follows:

$$\delta_r = \sqrt{d^2 + \delta x^2 + \delta y^2} \quad (3)$$

$$\Delta\phi = -(2\pi n/\lambda_o)\sqrt{d^2 + \delta x^2 + \delta y^2} \quad (4)$$

In a simple case of a one-dimensional array of emitters arranged on single line (y=0 for all) and the x axis is centered around the focal point, the phase compensation requirement for each emitting element located at x, is described by the following relationships:

$$\psi_i = \frac{2\pi n}{\lambda_o}\sqrt{d^2 + x_i^2} \quad (5)$$

$$= \frac{2\pi n d}{\lambda_o}\sqrt{1 + (x_i/d)^2} \quad (6)$$

$$= \beta d\sqrt{1 + (x_i/d)^2} \quad (7)$$

Figure 3A:
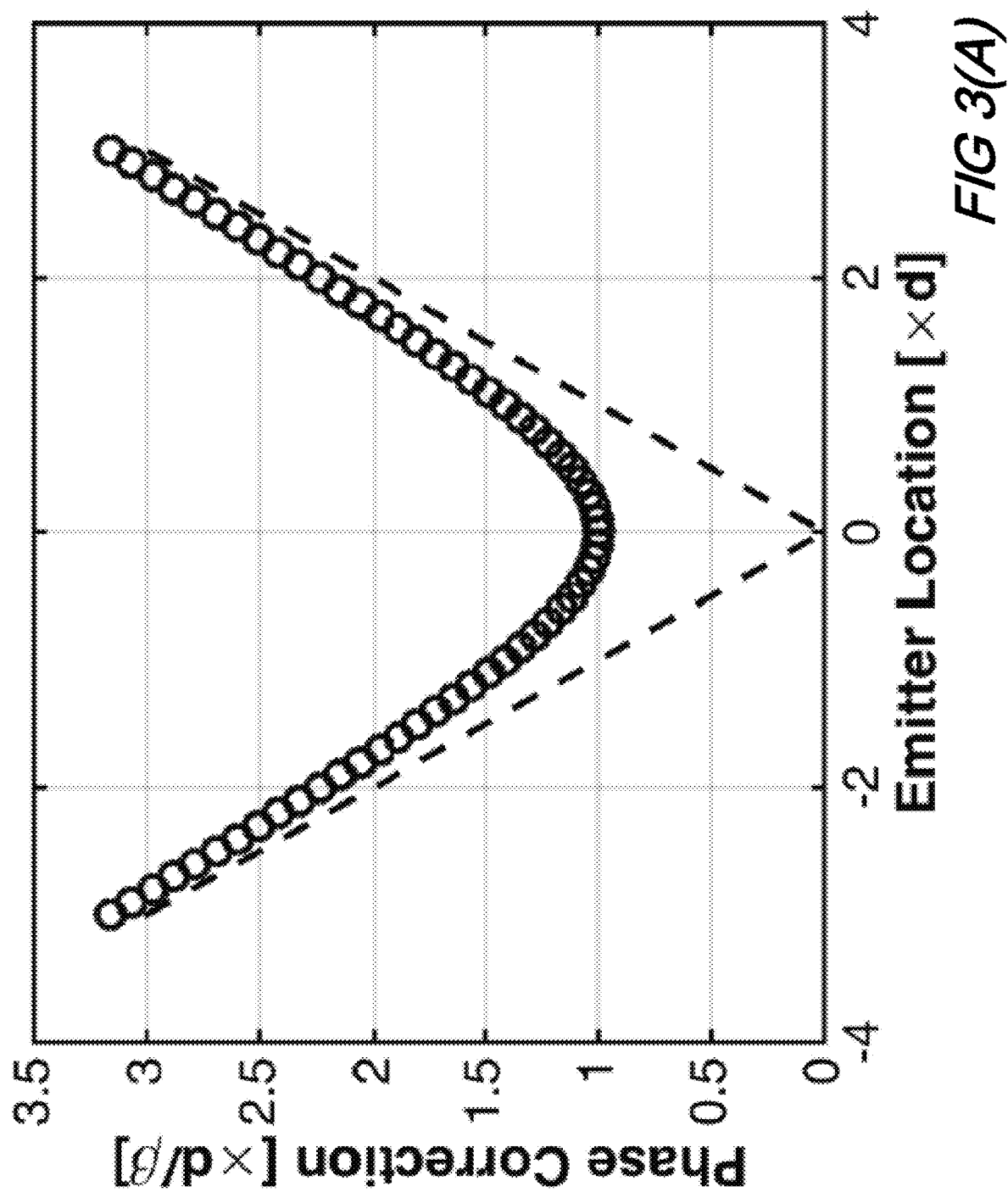
FIG. 3(A) is a plot of Phase Correction vs. Emitter Location illustrating the phase front for a one dimensional focusing phase array follows a hyperbolic function
Figure 3B:
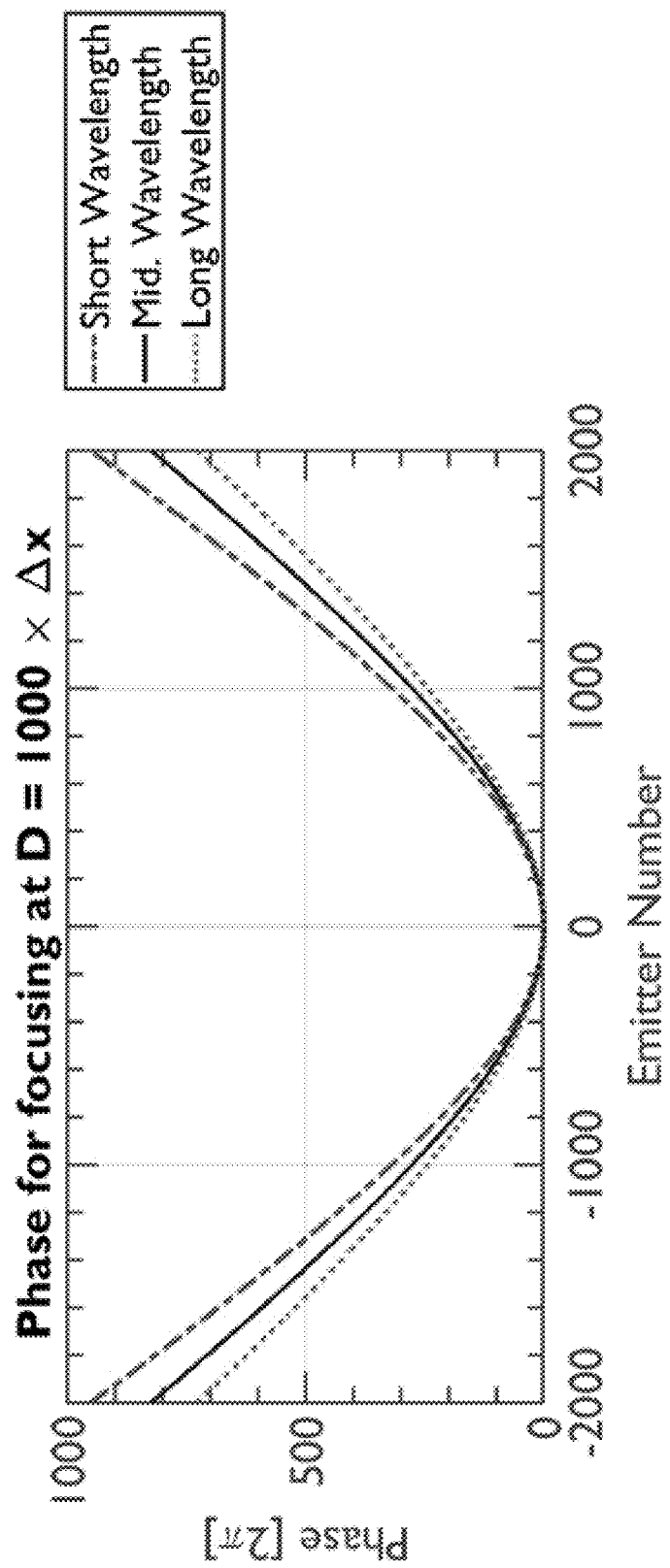
FIG. 3(B) is a plot showing phase for focusing for short, mid-length, and long wavelength emissions according to aspects of the present disclosure.

Therefore, the phase correction function may be defined by a hyperbolic function. FIG. 3(A) is a plot of Phase Correction vs. Emitter Location illustrating that the phase front for a one dimensional focusing phase array does follow such a hyperbolic function. FIG. 3(B) is a plot of phase vs. Emitter at different (long/short/mid) emission wavelengths. As may be observed from these figures, the hyperbolic phase correction required has the largest curvature at the center and is asymptotic to a line for emitters farther away. For emitters placed close to the center, this takes the familiar quadratic shape of elliptical lenses (Eq. (8)) and for elements placed at far distances it is like a plane wave with flat phase fronts.

$$\psi_i = \begin{cases} \beta\left(d + \frac{x_i^2}{2d}\right) & \text{if } x_i/d \to 0 \\ \beta x_i & \text{if } x_i/d \to \infty \end{cases} \quad (8)$$

Figure 4:
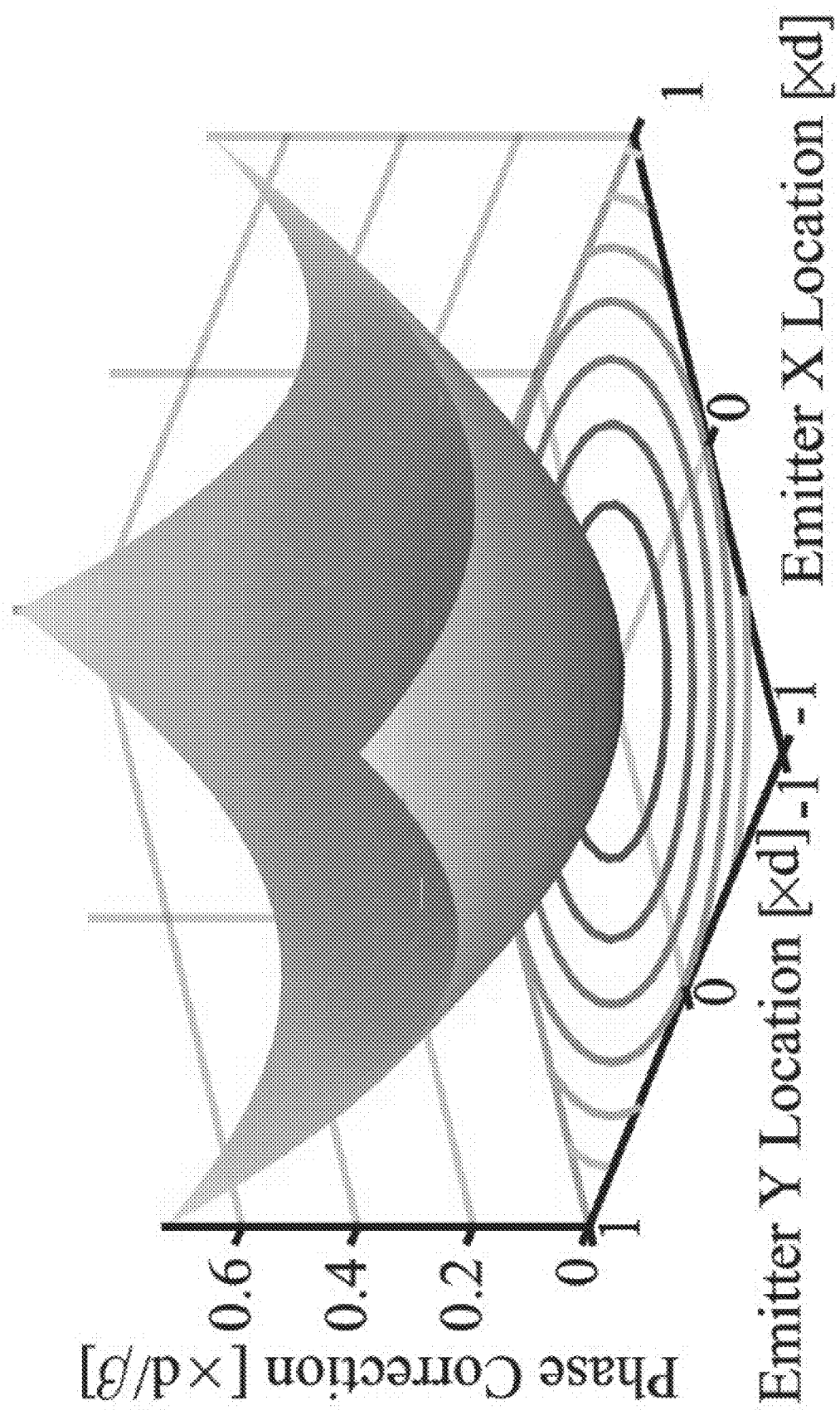
FIG. 4 is a plot of Phase Correction vs. Emitter Location illustrating the phase front for a two-dimensional focusing phase array follows a two-dimensional hyperbolic function according to aspects of the present disclosure.

These same principles apply to two dimensional (2D) arrays in which the emitters employ a 2D hyperbolic function for their phase correction. FIG. 4 is a plot of Phase Correction vs. Emitter Y location and Emitter X Location illustrating the phase front for a two-dimensional focusing phase array follows a two-dimensional hyperbolic function.

Figure 5:
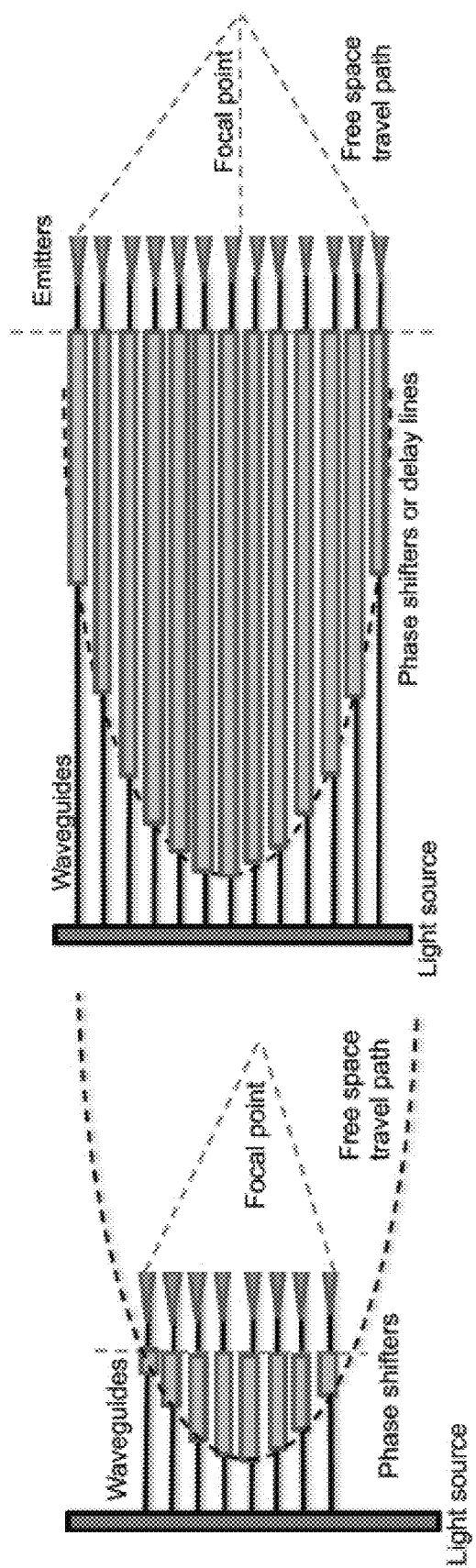
FIG. 5 is a schematic illustrating the imposition of a hyperbolic delay function on waveguides to ensure effective travel time from source to focal point for an array of optical or RF beams according to aspects of the present disclosure.

Turning now to FIG. 5 there is shown illustrative schematics of an optical phased array structure including light source in optical communication with a plurality of optical waveguides, which in turn are respectively in optical communication with a plurality of phase shifters, those phase shifters in respective optical communication with a plurality of emitters. As will be readily understood and appreciated, when the light source emits light, that emitted light is conveyed by the waveguides to the phase shifters which may—optionally—shift the phase of light traversing therein. Light exiting from the phase shifters is directed to the emitters where it is subsequently emitted. As shown further in the schematics of FIG. 5, the emitted light is directed to a single focal point via free space path(s).

As schematically illustrated in that figure, a hyperbolic delay function is imposed upon the waveguides through the effect of the phase shifters such that an effective travel time from the source to the focal point is equal for all the emitted light.

We note that to generate such a focused beam according to aspects of the present disclosure, light (or any other electromagnetic wave) starts from a uniform phase distribution and a hyperbolic distribution of delays is imposed on the waveguides. The amount of the delay—that advantageously may be provided by physical change in the waveguide geometry, thermal phase shifters, electro-optic phase modulators, or liquid crystal tunable delays—among others, is designed such that the total path length the light wave(s) travel(s) from the source of the electromagnetic radiation (Laser or microwave oscillator) to the focal point is equivalent—considering the speed of the wave in different media.

At this point we note additionally that the emitted phase front from the array may be any shape desired by altering the phase function(s) applied to the phase shifters. In particular, a piecewise function—or a hybrid function—which is defined by multiple sub-functions, each sub-function applying to a certain interval of the main function's domain (a sub-domain). As such, shapes such as a "V" shape, or inverted "V" shape are contemplated, as well as stepped functions. Additionally, conical shaped phase fronts may be generated as well, by affecting the phase front emitted in multiple dimensions. Even more complex shapes such as Bessel function shapes are contemplated.

Figure 6:
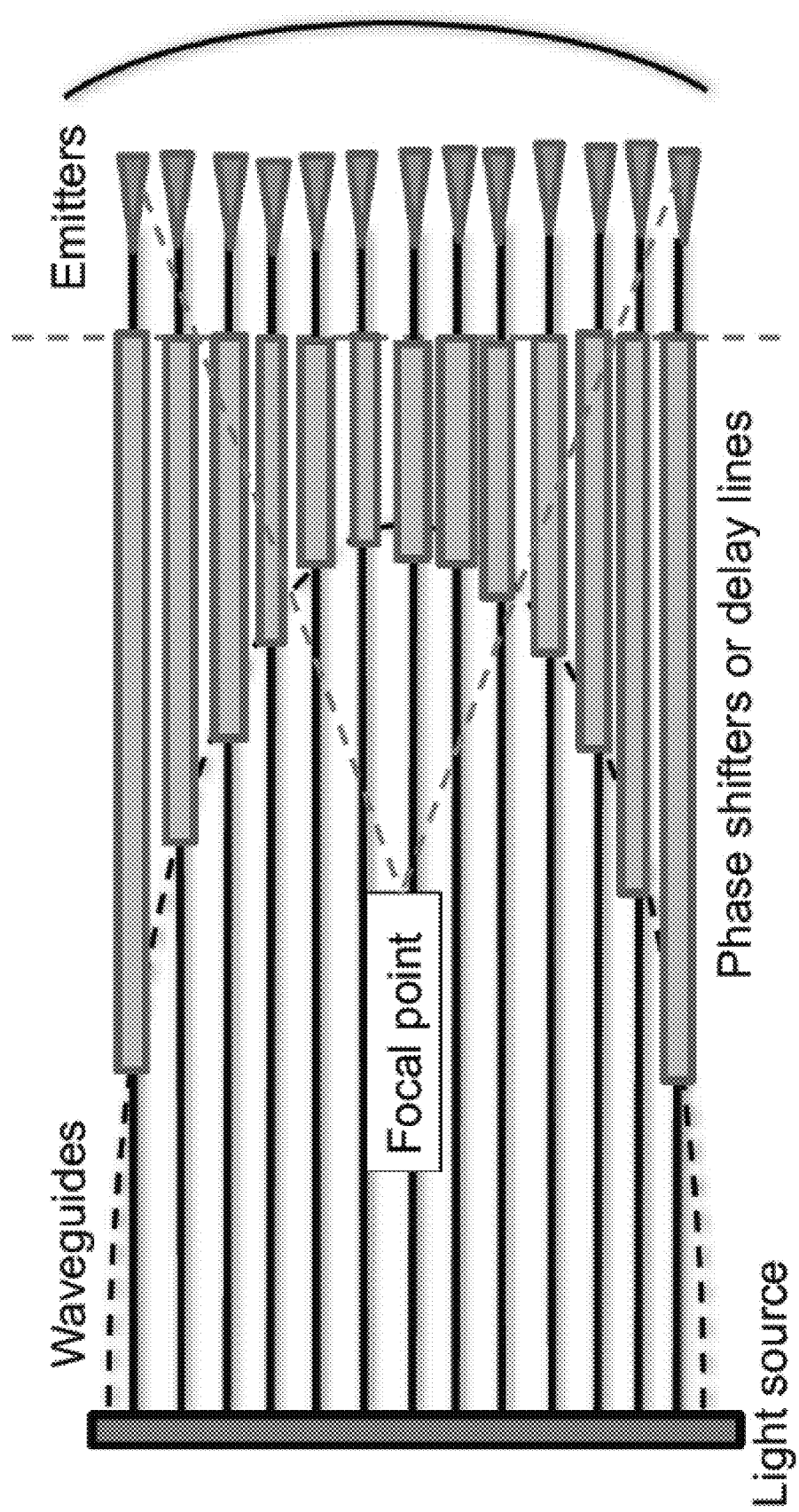
FIG. 6 is a schematic illustrating the imposition of a negative hyperbolic delay function on waveguides to ensure emitted optical or RF beams appear to originate from common focal source according to aspects of the present disclosure.

FIG. 6 shows an illustrative schematic of a negative hyperbolic delay function imposed upon the waveguides such that the beams all appear to be originating from a same, focal source. Accordingly, and as can be seen by inspection of FIG. 5 and FIG. 6, by choosing an appropriate hyperbolic or inverse hyperbolic phase envelop function, the combined beam can be made to focus or diverge. And while a hyperbolic delay function can be imposed upon the waveguides to ensure the effective travel time is equal for all beams as measured from the source to a focal point, similarly a negative hyperbolic delay function can be imposed upon the waveguides to ensure beams look like they are all coming from the same focal source thereby producing a divergence of the beams. This divergence is achieved by ensuring the delay experienced by the light wave in each waveguide is identical to that of all wave(s) starting from the same focal point.

Figure 7:
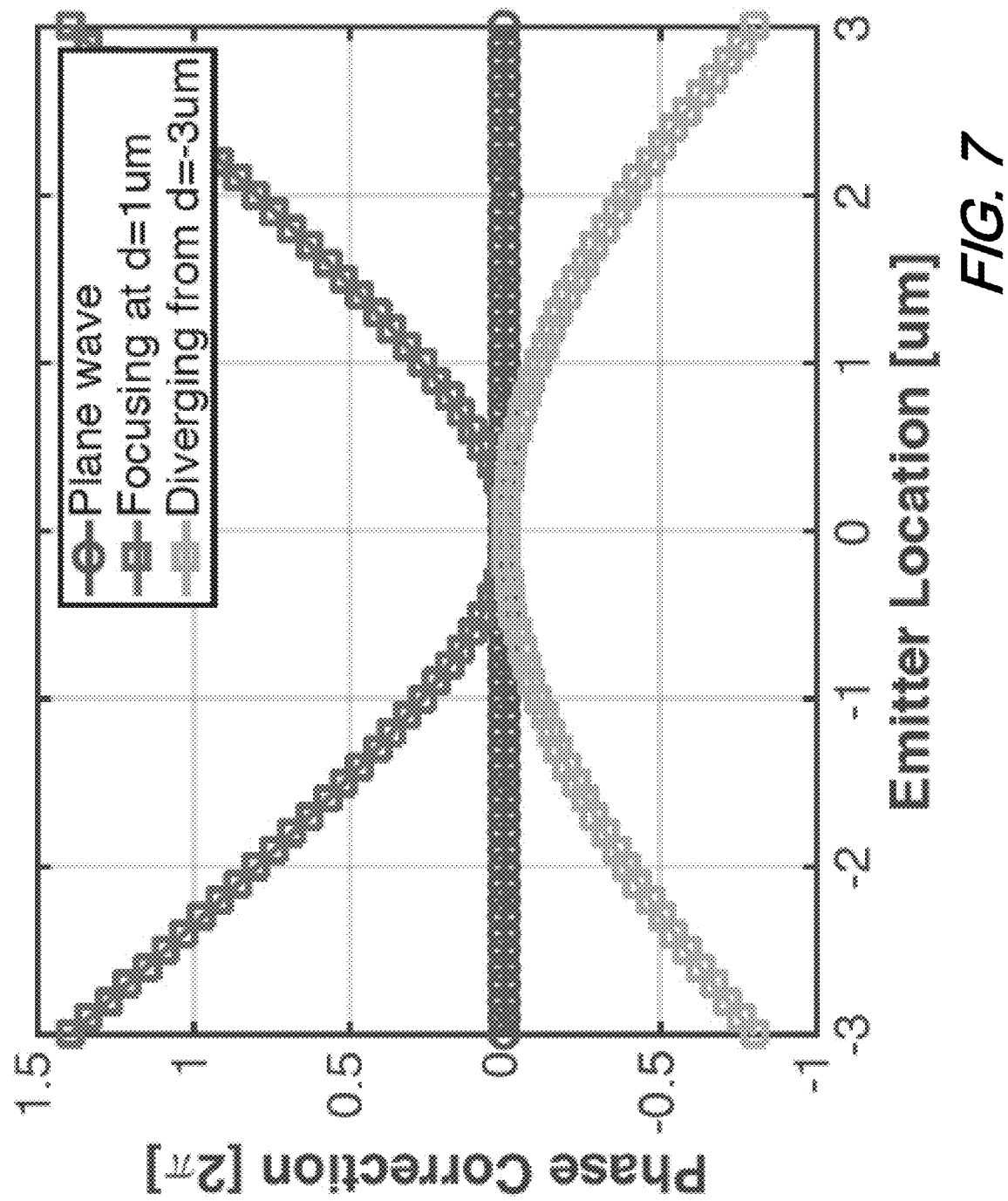
FIG. 7 is a series of plots of Phase Correction vs. Emitter Location illustrating that adjusting the curvature of a phase front may produce different focal points according to aspects of the present disclosure.

We now note that adjusting the curvature of the emitted phase front advantageously leads to different focal points (focal distances). Turning now to FIG. 7, there is shown a plot of Phase Correction vs. Emitter Location of three curves. As may be observed by inspection of that figure, adjusting the curvature of the phase front can lead to different focal points. A sharp curvature leads to focusing at a closer distance (top curve), while a flat phase leads to a planar beam focused at infinity (middle curve). A negative sign added to the curve (bottom curve) leads to emitted waves diverging from each other as if they were originating from a focal point only 3 μm away. Of course, and as previously noted, such phase front curvatures may be selectively produced by imposing a hyperbolic phase function on the waveguides through the effect of the phase shifters.

We note that as the size of the overall array (and its aperture size which determines the tightness of the focal spot) increases, the length of all waveguides should be increased to accommodate a larger hyperbola.

Figure 8:
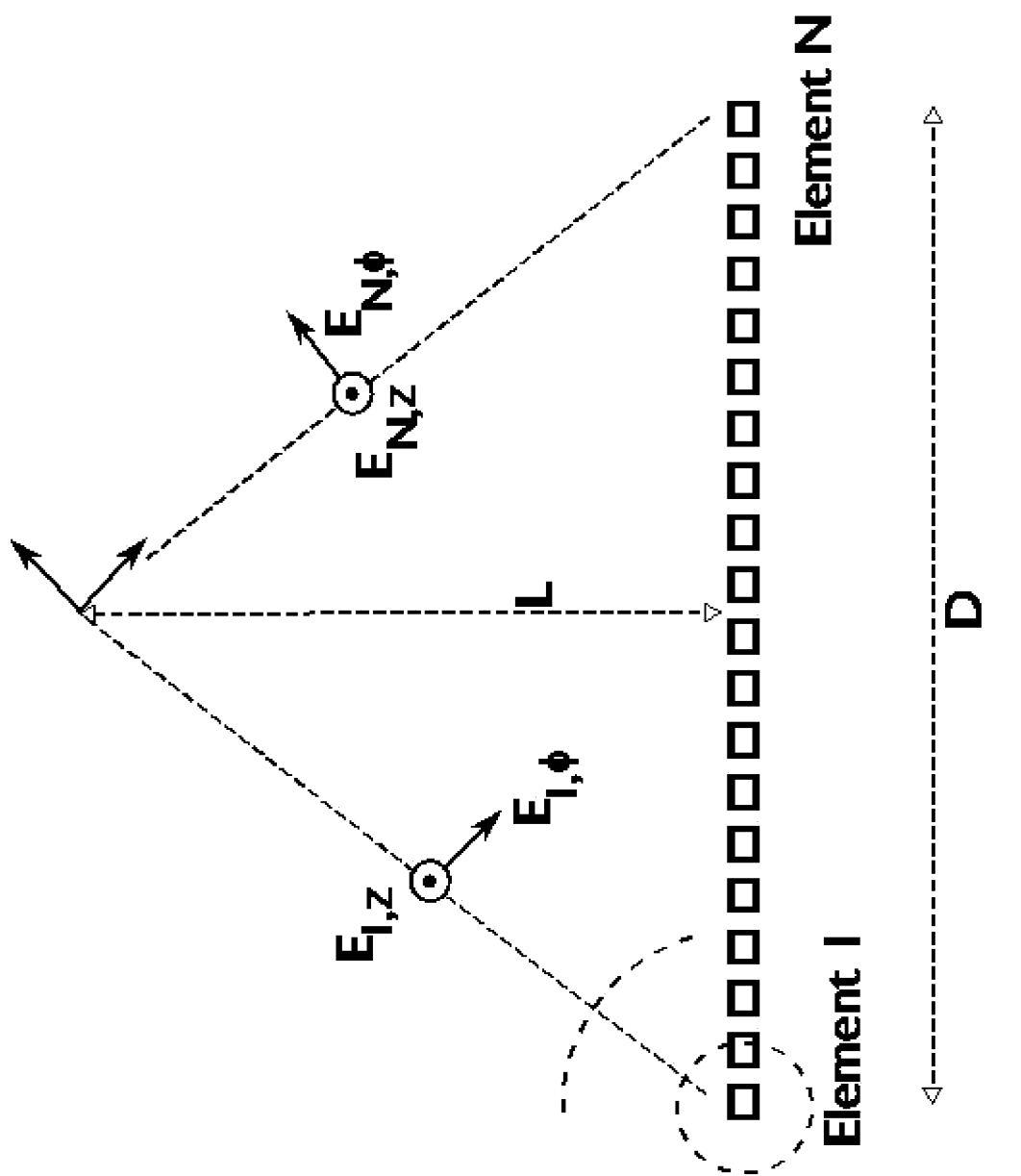
FIG. 8 is a schematic diagram illustrating vectorial addition of field components aspects of the present disclosure.

FIG. 8 is a schematic diagram illustrating vectorial addition of field components. The important aspect of this vectorial treatment is that if the focal distance is short compared with the size of the aperture, the direction of the electric field arriving at the observation point from each emitter changes for each emitter even if the radiated field has only azimuthal field components. Therefore, for focal points designed to be very close to the array, the scalar addition of the field from all emitters is not enough and the direction of the field vector should be taken into the account. For cases of far field observation (where L>>D) the in-plane elements of the field components from all emitters add up to create a Fourier transform. When the focal distance (L) is comparable to the width of the array (D), the angle of the electric fields should be taken into consideration. Additionally, if the emitters are omnidirectional point emitters, the intensity of the electromagnetic radiation drops with $1/r^2$ as distance increases. If the emitters are line emitters, the intensity diminishes with $1/r$ as the observer is moved away from the emitter and the electric field amplitude drops by $1/\sqrt{r}$ with the distance r.

Advantageously, and according to yet another aspect of the present disclosure, as the length of the phase shifting elements is limited by both the chip size and possibly optical loss of the phase shifters, the (hyperbolic) phase function can be wrapped by subtracting multiples of 2π from it to convert the true time delay system to a modulo-2π alternative.

Figure 9:
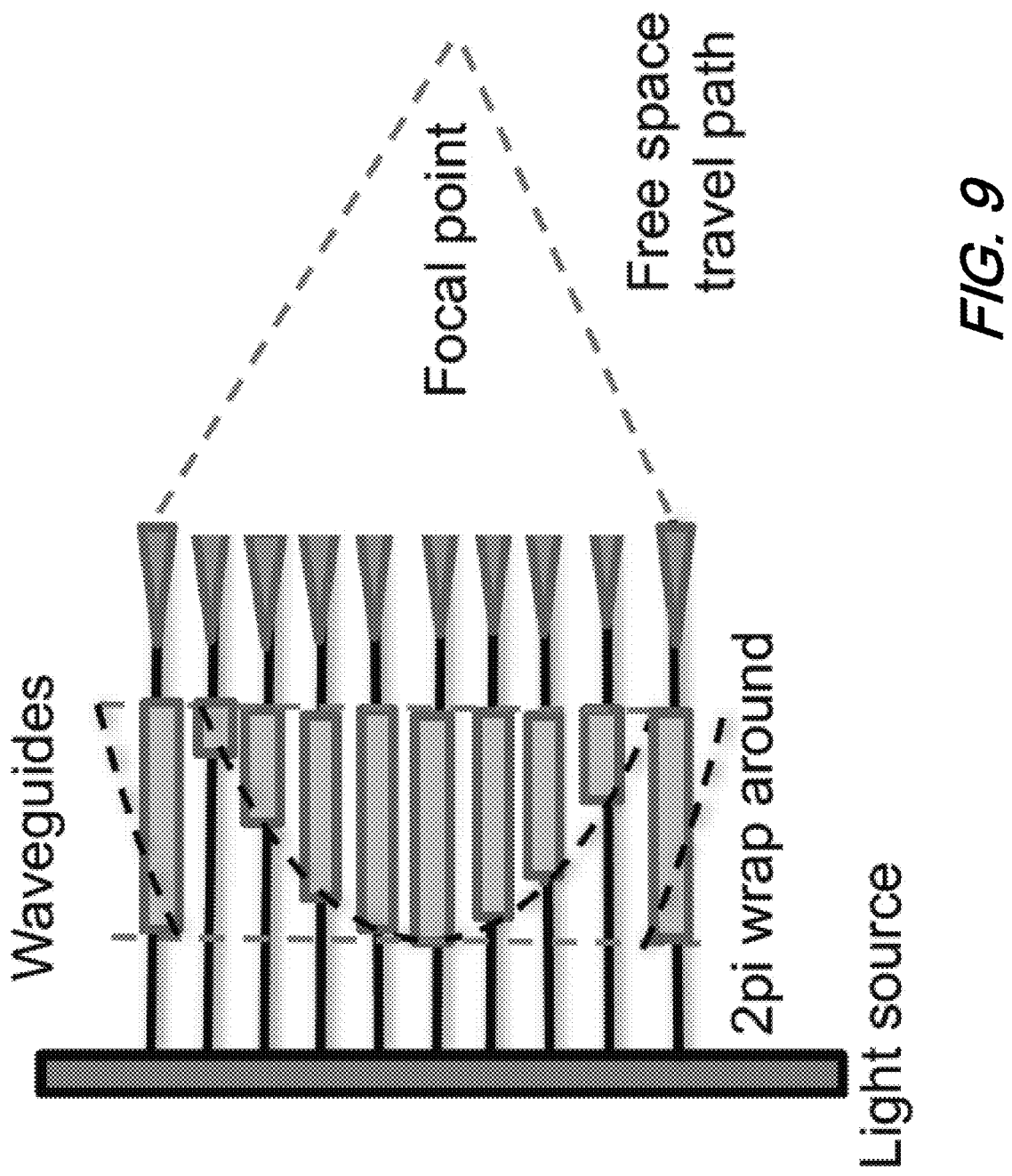
FIG. 9 is a schematic illustrating that subtracting $2\pi$ from a phase envelope when a required waveguide length is too long leads to larger arrays without the need for extremely long phase shifters according to aspects of the present disclosure.

It should be noted at this point that a system so configured is limited in its high-speed operations and pulse shaping where the exact delay through all signal paths would affect time domain width of short pulses. On the other hand, in CW applications there is not a difference between 0 and 2π phases as is shown illustratively in FIG. 9. With reference to that figure, it may be observed that subtracting 2π from the phase envelope when a required waveguide is too long to be conveniently included in the array may advantageously permit the construction of compact array structures and systems constructed therefrom.

As will be readily appreciated by those skilled in the art—and according to an aspect of the present disclosure—since phased array structures and systems constructed therefrom are capable of focusing emissions from the array to a focal point as a result of the application of a hyperbolic phase function, it is further advantageous and according to yet another aspect of the present disclosure to employ adjustable phase shifters such that the phased arrays may dynamically change focal depth and focal spot.

Operationally, this is performed by dynamically adjusting the phases on the waveguides through the effect of a dynamically tunable shifter. Examples of suitable dynamically tunable phase shifters include—but are not limited to—liquid crystal phase shifter, thermally tunable delay (visible and infrared light), and electro-optical silicon phase shifters (infrared).

Figure 10:
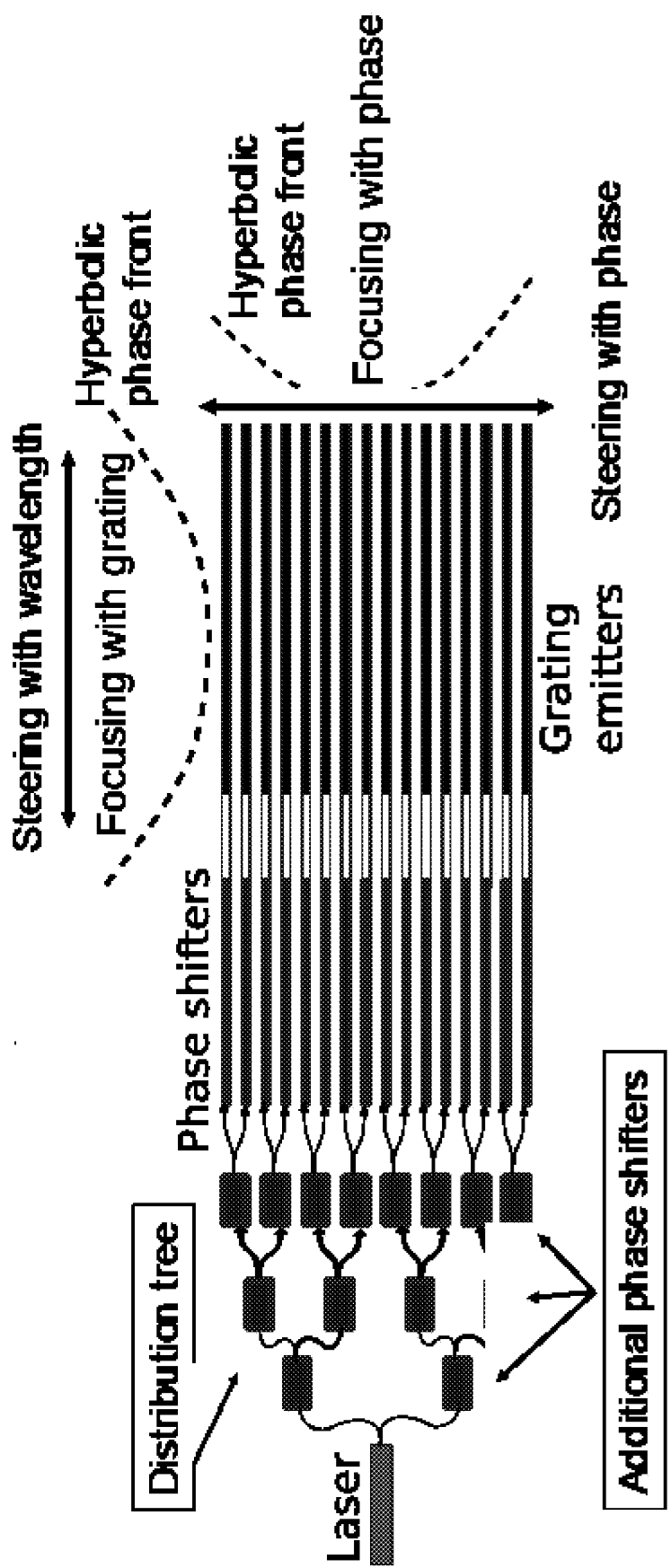
FIG. 10 is a schematic illustrating the overall operation of an optical structure including a phased array according to aspects of the present disclosure.

FIG. 10 is a schematic illustrating the overall architecture and operation of an optical structure including a phased array according to aspects of the present disclosure. As illustratively shown, this structure may employ one or two fiber coupled external lasers (replaceable with integrated DFB lasers), a power division and phase shifting network (with phase shifters in which the response time depends on the type of phase shifters used), a dense array of individually controlled radiating elements (emitter), and—while not specifically shown—an optional low dark-current germanium photo-detectors for optical reception and readout. While not specifically shown, the structure may be advantageously integrated onto a single silicon photonic chip fabricated using known silicon photonic fabrication techniques. The lasers may be on a separate structure and interconnected to the silicon photonic chip via known coupling mechanisms. The laser can be also a part of the silicon chip by embedding a III-V gain section into the silicon substrate or attaching a gain section or a DFB laser to the facet of the silicon chip.

Operationally, and with continued reference to FIG. 10, a tunable laser is coupled into the chip with—for example—a single mode fiber. The wavelength of the laser is chosen to be sufficiently close to a desired excitation peak of an object to be illuminated by its emissions. For example, Chrimson channelrhodopsin may be chosen for optogenetic applications. Advantageously, it is possible according to the present disclosure to use a second laser for inhibition of other types of neurons selectively activated with silencing photosensitive proteins. For two photon imaging applications the wavelength of the laser can be chosen such that the laser beams from individual emitters do not experience significant scattering or absorption when passing through the subject (tissue or material) and strongly excite the target at the focal point where the light is strongest.

A series of liquid crystal phase shifters (or alternatively thermal phase shifters or electro-optic modulators for IR applications) as part of a distribution network interconnecting the lasers to the phased array of emitters, create a desired phase distribution across the phased array. As can be appreciated, when a particular operating focal point distance is desired, the appropriate hyperbolic phase front of the phase array is determined for that focal distance and the phase shifters are adjusted to achieve that appropriate phase front. With electrooptic phase shifters this pattern can be modified with extremely high speeds moving the focal spot within a few picoseconds while the thermal and liquid crystal phase shifters operate with longer delay times.

As may be understood, two fundamental properties of such a phased array structures are the overall size of the array (numerical aperture—NA) and the separation between emitting elements (pitch). Similar to a conventional lens, a larger array size (larger NA) leads to tighter, more well defined, focusing points.

FIG. 11(A) and FIG. 11(B) are plots showing: FIG. 11(A) the effect of array size on focal spot size in which the focal radius is reduced as the array size is increased from 100 µm to 10 mm; and FIG. 11(B) showing as the separation between emitters is reduced the side bands are suppressed.

Figure 11C:
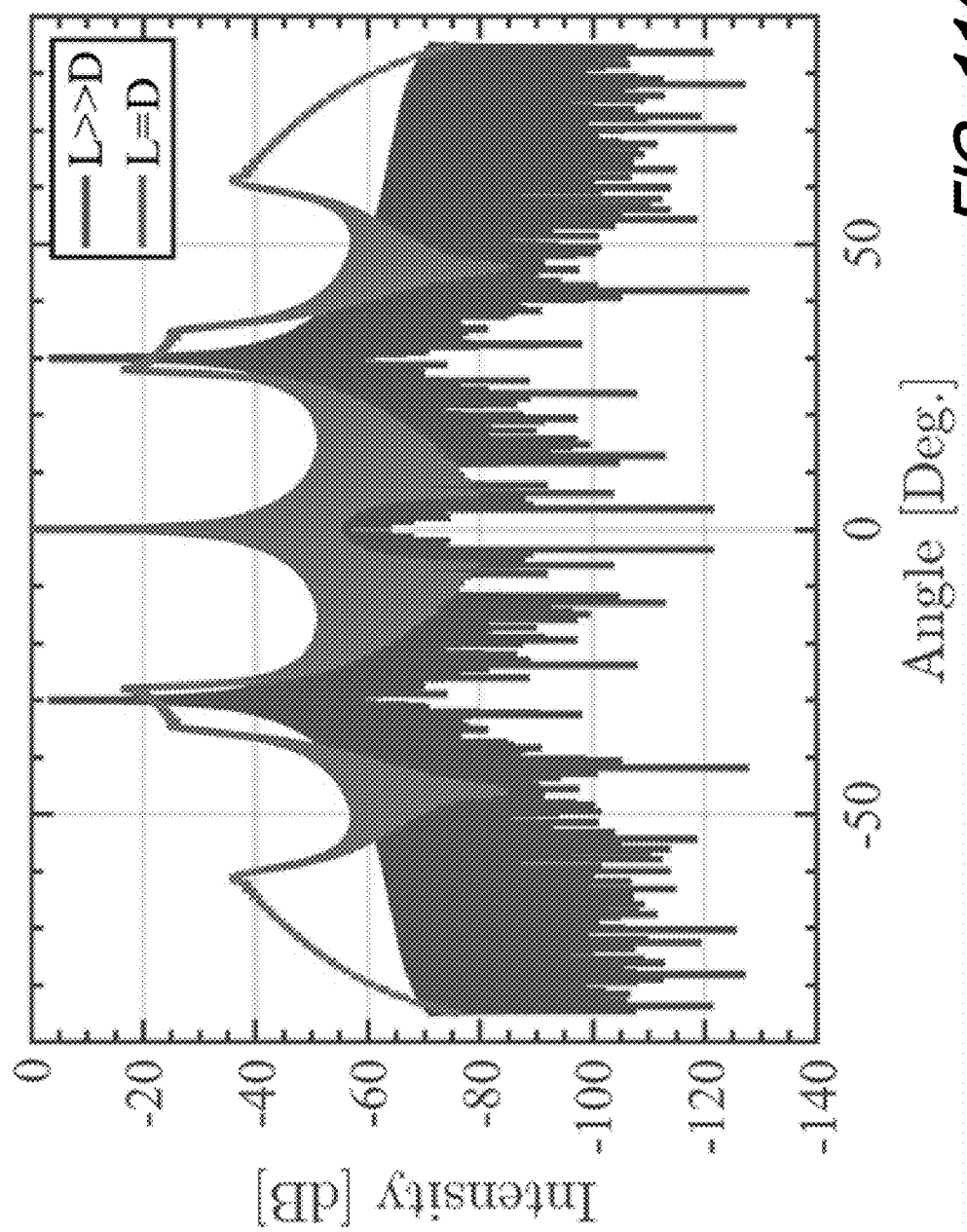

As may be observed from FIG. 11(A) at a 10 mm focal distance, the focal spot of the phased array becomes significantly smaller as the size of the array is increased from 100 µm to 10 mm. Notably, the number of focal spots observed is dependent on the separation of the micro-antennas. If the emitters are spaced farther apart, the hyperbolic phase front is down-sampled, and this uncertainty allows for more side-bands to appear in the interference pattern. As can be understood when the separation of emitters is larger than half a wavelength, side lobes appear in the far field as illustrated in FIG. 11(C). When the target focal distance is reduced, the emission into the side lobes is not as focused as it is in the main beam. In fact, the focal distance of the side lobes is shorter than the main lobe.

As may be observed by inspection of FIG. 11(B), as the separation between emitters is reduced to 1 µm all other side bands are suppressed and the energy of the emitting array is concentrated in the unique focal spot. In general, if the separation between the emitters is too large, side bands will appear.

Figure 12B:
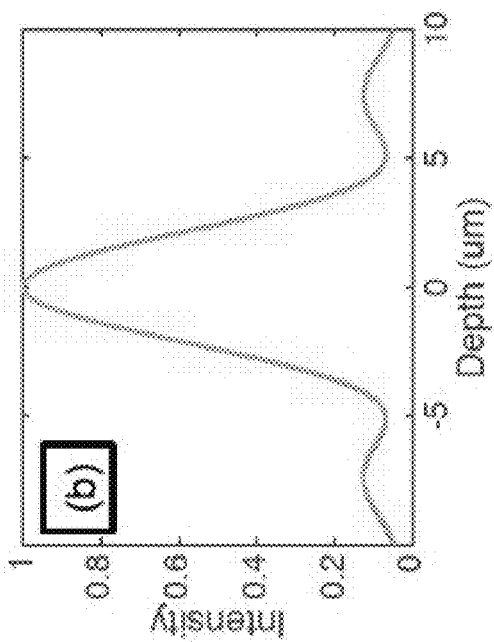
FIG. 12(A) and FIG. 12(B) are plots of FIG. 12(A) Normalized Intensity vs depth vs distance (X) and FIG.
Figure 12A:
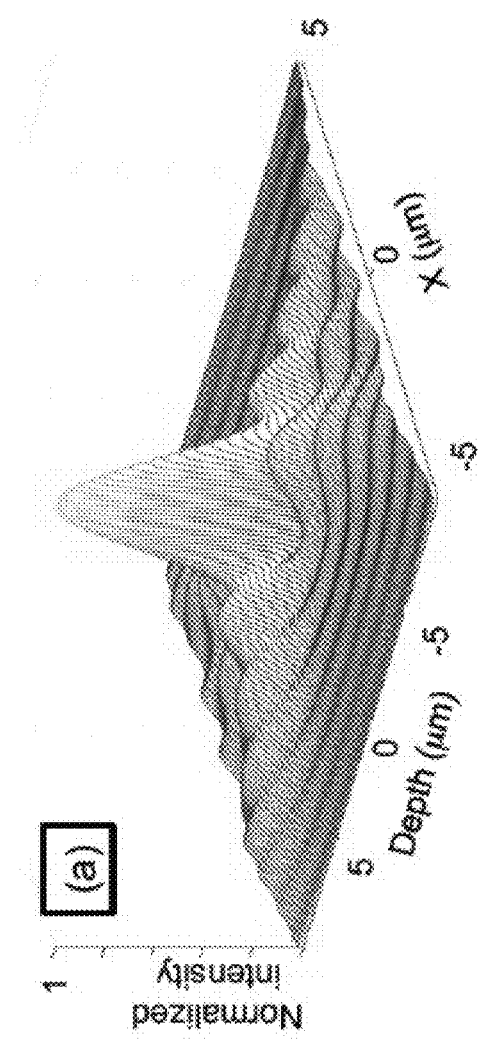

FIG. 12(A) and FIG. 12(B) are plots showing: FIG. 12(A) a surface plot of the intensity pattern of a 10 mm-sized array with the focal length set at 10 mm in which the focus depth is 10 µm and focal spot size is 4 µm; and FIG. 12(B) illustrating the depth of focus depending on the ration of f/L wherein the normalized intensity of two arrays in which L=1 mm, f=1 mm and L=10 mm, f=10 mm are overlaid. This shows that the depth of focus depends on the ratio between the array size and the focal depth. The larger the array, the tighter the focal point becomes in all dimensions, and the focal depth is reduced. This allows larger arrays to be very specific when targeting a subject as both the focal width and depth are tighter for larger arrays.

At this point of this discussion those skilled in the art will readily appreciate that with respect to optogenetic excitation, bioimaging, surgical applications or any nonlinear pulse operation one factor of utmost importance is depth of focus for emitting systems. More specifically, it is critically important that the focal depth for such applications/systems is as short as possible such that other tissues/materials in front or behind a targeted focal point spot do not experience the power threshold intended for that focal point.

Similar to spot size, it is noted that depth of focus is also dependent on array numerical aperture (NA). Since depth of focus scales linearly with the f/L ratio where f is the focal length and L is the width of the overall phased array with the quadratic phase front. Accordingly, for a particular focal distance, both the spot size and the depth of focus may be improved by employing larger and larger arrays if the losses in the system and the number of addressable phase shifters allow it.

In current demonstrations of contemporary optical phased arrays, the principal mechanisms of loss are due to poor fill factor and down emission of the grating emitters. In our focusing phased arrays the fill factor is addressed with a <1 µm spacing between the grating emitter elements. The problem of down emission is an equally important problem.

In a traditional grating emitter design approximately 50% of the light is emitted in the upward direction and 50% is emitted downward. As is readily apparent to those skilled in the art, a mirror could be utilized to force the downward emitted light to be redirected upwards. However, the spacing of the mirror would have to be set at a well-defined spacing, namely:

$$d=\lambda/4+\Delta/2\times m;$$

where m=1, 2, 3 . . . , with small values of m being more desirable due to reduced angular and wavelength dependence.

One challenge is in finding a distance that meets this condition and fits within the process layer stack sufficiently far away from a waveguide layer so as not to induce absorption in the guided mode. For this reason, we have taken a different approach. Instead of using a metal layer to reflect the downward emission upwards, we have placed a second set of dipole radiators (or grating layer) that is shifted by $\pi/2$ in their temporal phase from the first layer and are additionally separated by a distance $\lambda/4$ from the upper emitter layer. This configuration is equivalent to a pair of dipole radiators separated by a distance $\lambda/4$ with a $\pi/2$ phase advance in the bottom dipole's excitation waveform. The result is that in the downward direction, emission from the dipoles is out of phase and in the upward direction, in phase, ensuring that only the upward directed wave is excited.

Figure 13A:
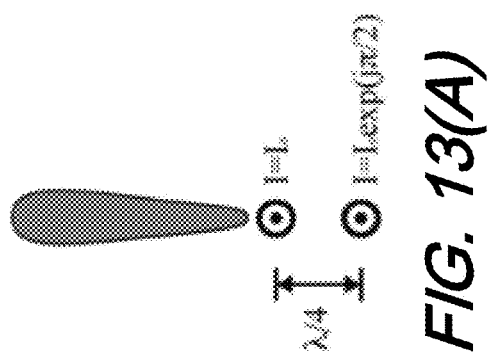
FIG. 13(A), FIG. 13(B), and FIG. 13(C), are schematics illustrating.
Figure 13B:
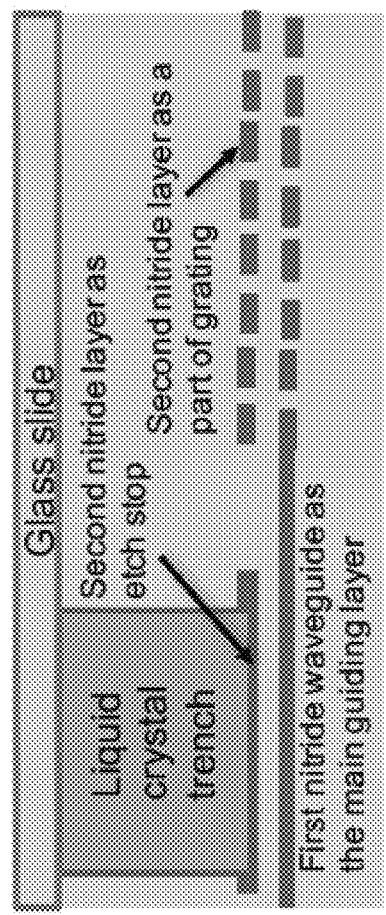
Figure 13C:
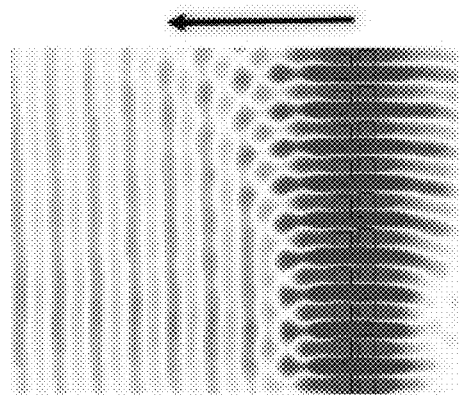

FIG. 13(A), FIG. 13(B), and FIG. 13(C), are schematics illustrating: FIG. 13(A) implementing efficient vertical emitters based on quarter-wave shifted dipole antennas; FIG. 13(B) a second silicon nitride layer as sacrificial layer and used as upward emission; and FIG. 13(C) emission pattern of the optimized grating at 633 nm when the separation between two nitride layers is 70 nm, grating period is 410 nm and top grating is slightly (40 nm) is offset from the bottom grating mode according to aspects of the present disclosure. Note that for 840 nm operation, the grating period will be proportionally longer.

Another important aspect of grating design that will be readily understood and appreciated by those skilled in the art is its focusing and steering functions. As was shown previously with respect to FIG. 10 the transverse focusing of the array radiation is performed by the tunable quadratic phase front of the phased array. On the other hand, the one-dimensional (1D) phase function across the array does not affect its radiation pattern in the longitudinal direction. Therefore, it is necessary to design the long (and weak) gratings in a way that the focusing in the longitudinal direction is performed by the individual grating emitters.

Figure 14A:
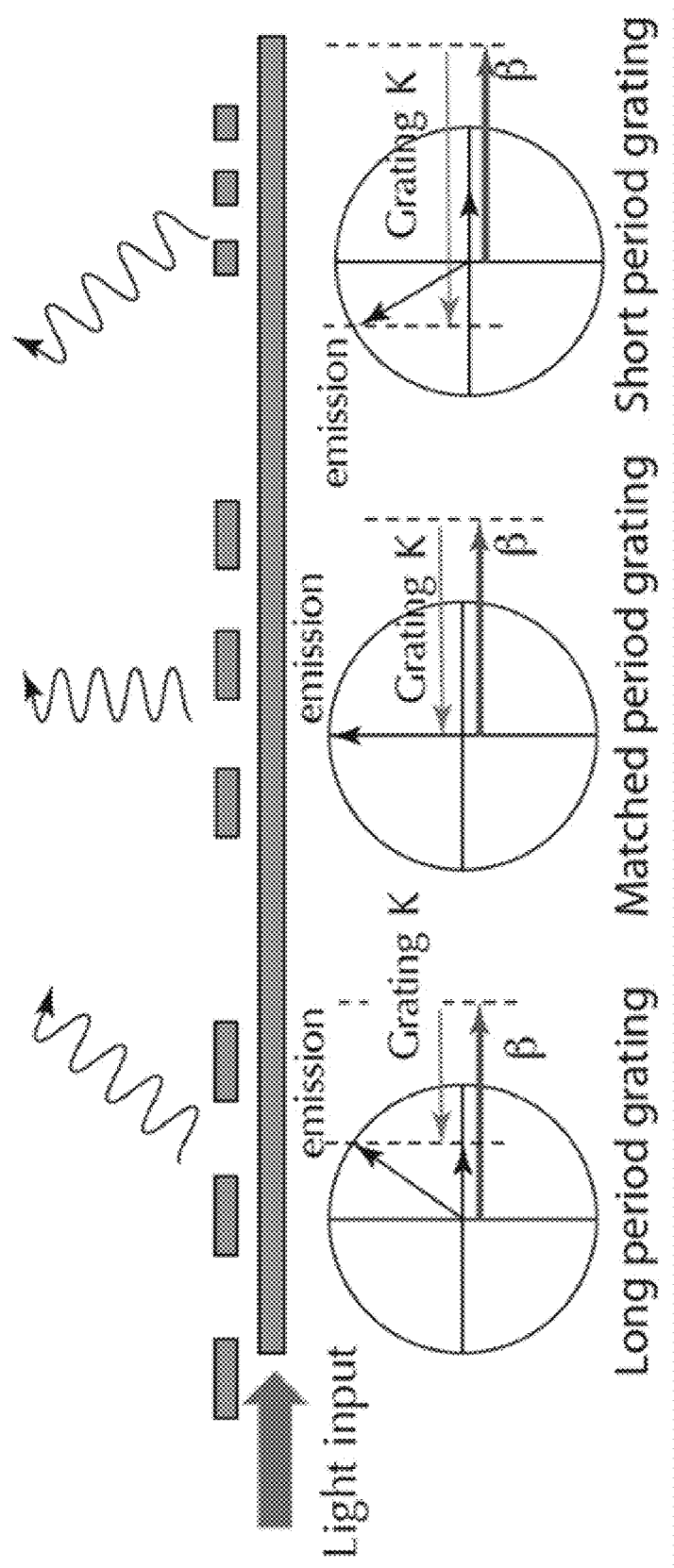

With simultaneous reference now to FIG. 14(A), FIG. 14(B), and FIG. 14(C), it may be observed that this is achievable by adjusting the period of the grating along the propagation length in such a way that the emission ray always points toward the desired focal spot. According to the Bragg theory of grating emissions, the direction of emission from a grating is determined by the phase matching condition. The wave number of the guided mode is determined by the effective index of the guided mode determined by the size and index of dielectric guiding layer ($\beta = n_{eff} \frac{2\pi}{\lambda_0}$). The grating wave vector ($\kappa = m \times 2\pi/\Lambda$ m=0, 1, 2, ...), which is determined by the period of the grating ($\Lambda$), is subtracted from $\beta$ and if the resulting vector falls in the radiation circle the direction of emission (for m=1) is determined by:

$$\cos(\theta) = \frac{k_x}{k_0} = \frac{\beta - \kappa}{2\pi/\lambda_0} = \frac{n_{eff}/\lambda_0 - 1/\Lambda}{1/\lambda_0} \qquad (9)$$

where $\theta$ is the angle with the vertical direction.

Figure 15C:
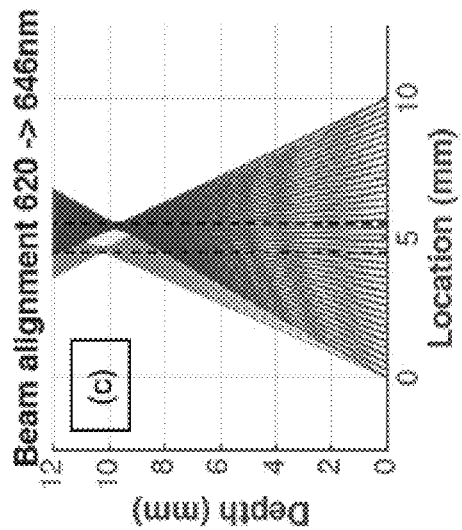
FIG. 15(A), FIG. 15(B), FIG. 15(C), FIG. 15(D), and FIG. 15(E) illustrates.
Figure 15B:
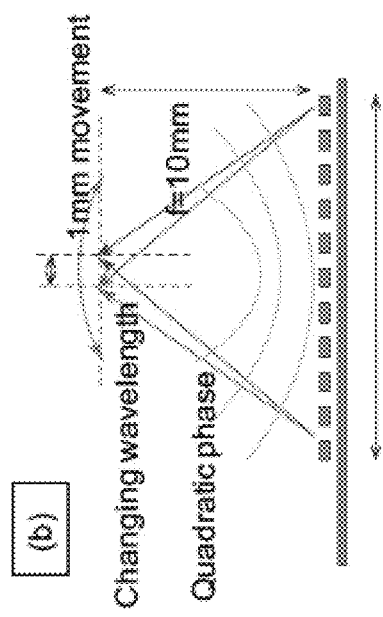
Figure 15A:
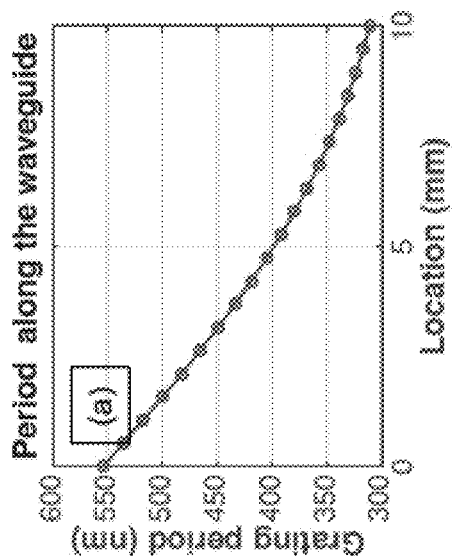
Figure 15D:
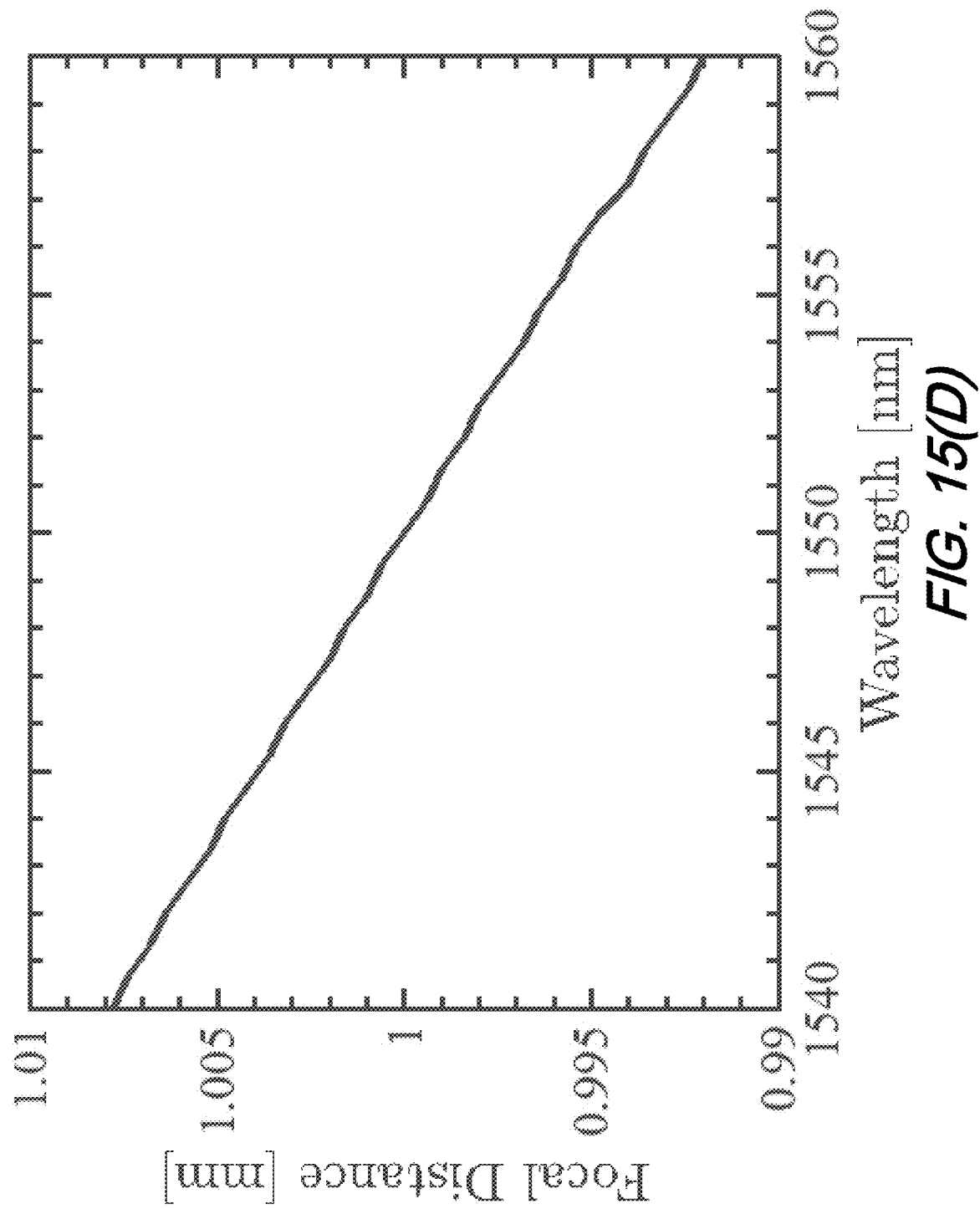
Figure 15E:
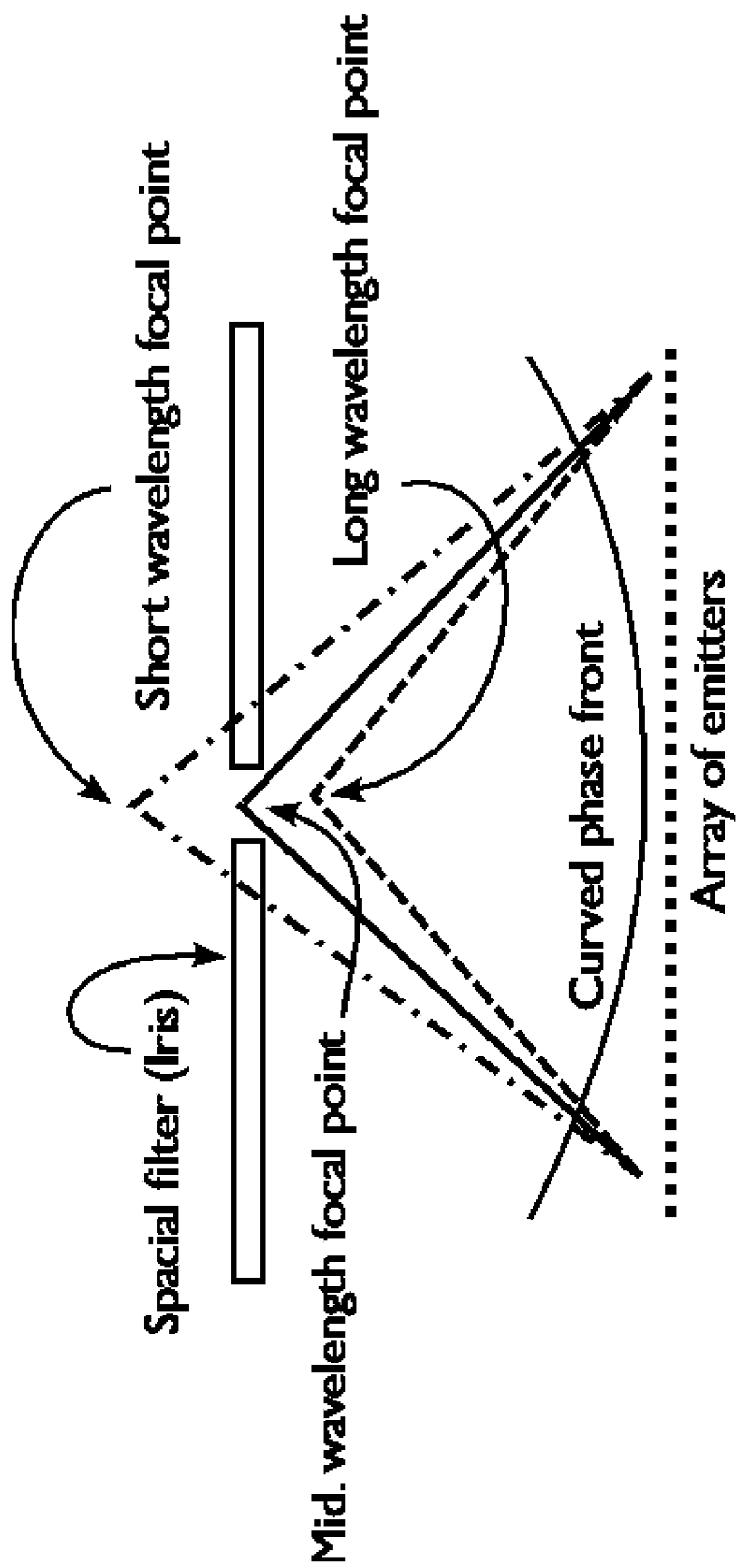

As shown in the figure the $\kappa$ of the grating may be shorter at the beginning of the array and must gradually be increased toward the end of the grating. This may be achieved by a gradual shortening of the grating unit cell. With reference to FIG. 15(A), FIG. 15(B), FIG. 15(C), and FIG. 15(D) which illustrate: FIG. 15(A) a plot of Grating Period vs. Location showing the period of a grating gradually modified along a waveguide to maintain radiation pattern pointing toward a focus point; FIG. 15(B) a schematic illustrating a change in wavelength changes the radiation direction at all points along the waveguide and steers the focal spot along the waveguide; and FIG. 15(C) a plot of Depth vs. Location illustrating the simulation of steering effect that as the wavelength of the laser is changed from 620 to 646 nm the focal spot moves across 1 mm on the focal plane; and FIG. 15(D) which illustrates focal distance vs. wavelength, all according to aspects of the present disclosure;

Assuming that we design an array to work with a red color laser, (as shown in FIG. 15(A)) to achieve a 10 mm focal distance for a grating emitter which is 10 mm long, the period of the micro-antenna is gradually shortened from 500 nm to 300 nm to focus light at a focal spot 10 mm away from the chip. This range is suitable for contemporary fabrication process as the minimum feature sizes that can be reliably and repeatedly fabricated with present-day 193 nm immersion lithography is 100 nm and it is well suited for gratings exhibiting the minimum period of 300 nm and 70% fill factor. For applications such as biological ones requiring a long penetration depth into tissue(s) (840 nm), grating fabrication will be easier as the period is proportionally longer. For systems operating at infrared range of the spectrum the required grating period will be even longer (depending on the effective refractive index of the waveguide). With final reference to FIG. 15(E), it may be observed how focal point as a function of wavelength is employed to vary focal point distance from an array of emitters that are configured to emit—for example—a curved, non-linear phase front according to aspects of the present disclosure. Shown further in this schematic diagram, a spatial filter (Iris, aperture) is positioned at a location away from the emitters such that only selective wavelength(s) are allowed to pass thereby providing spatial filtering to the focused phase front so emitted.

As will be further appreciated by those skilled in the art, hyperbolic phase fronts required for focusing in a transverse direction requires individual phase control of all emitting elements. Of course, as the size of the array grows to thousands (or even millions) of elements, addressing all individual phase shifters will require increasingly more wiring, pads, wire-bonding, and routing schemes to interconnect them. Fortunately, such large arrays including millions of emitters may be directly controlled with 3D bonded CMOS circuitry positioned directly below or above an integrated photonics chip including the array(s) or the CMOS can control the photonics via an interposer providing the connection between the phase shifters and the controllers. Should arrays exhibiting such large sizes be unnecessary, simpler arrays including only hundreds of phase shifters may be controlled with wire bonding and simple electronics (as shown in FIG. 16 and FIG. 17).

Figure 16:
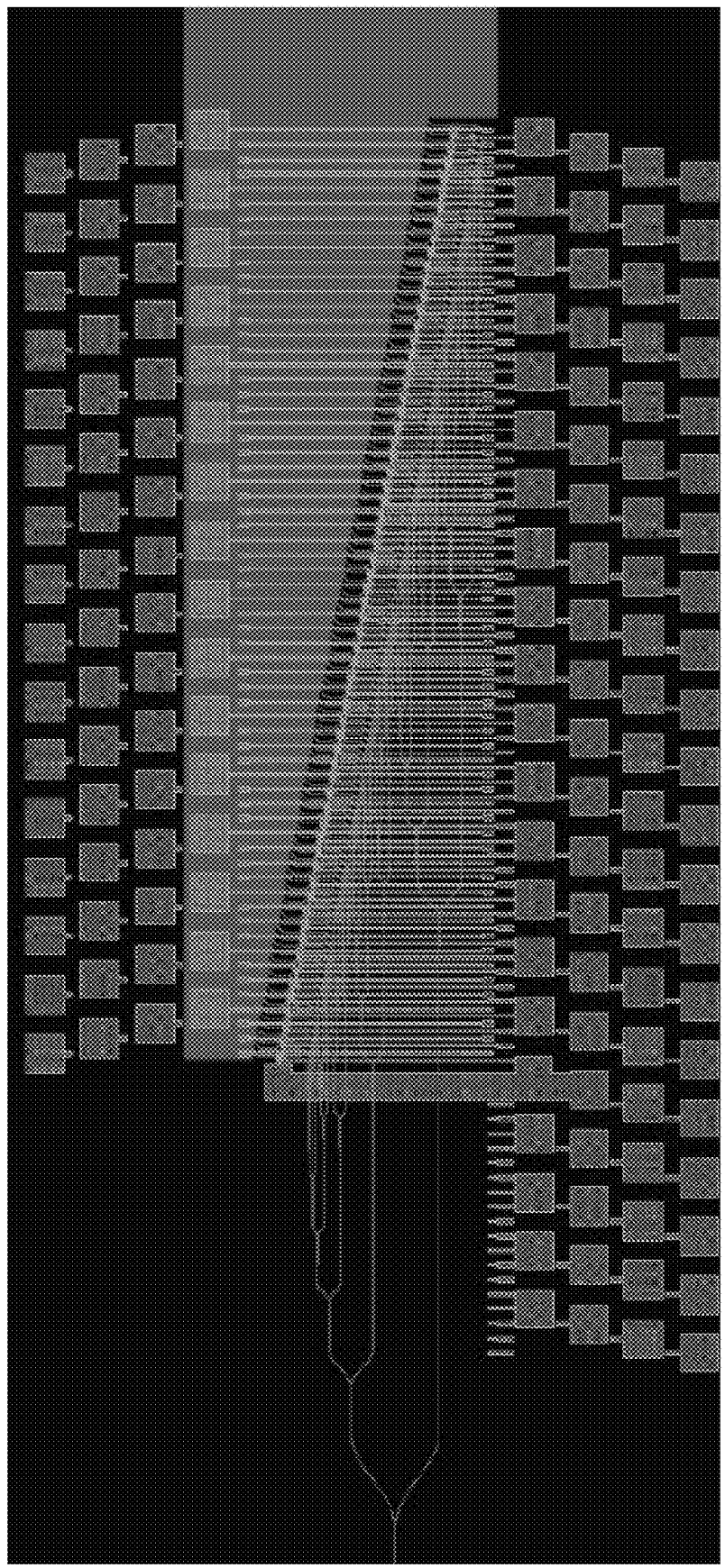
FIG. 16 is a schematic illustrating a one-dimensional phased array layout with individual phase control of each element according to aspects of the present disclosure.

With simultaneous reference now to those figures, it may be observed that FIG. 16 shows an illustrative one-dimensional phased array with individual phase control of each element. When the size of the array is smaller the phase function is approximately quadratic. FIG. 17(A) is a schematic illustrating a one-dimensional phased array structure operable to provide voltage-controlled sweeps; and FIG. 17(B) a plot of quadratic Phase vs. Emitter Location illustrating the phase pattern required for individual elements when a focusing (quadratic) phase front is desired and by placing elements (shown as circles) farther apart down-samples the quadratic phase function according to aspects of the present disclosure. As may be appreciated, such arrays advantageously offer the flexibility of creating any desired phase distribution (discretized by the separation between the emitters, which can be smaller than one wavelength). All array elements are individually phase shifted to attain the desired phase front. Also, higher levels of the tree structure can have phase shifting elements (green color) to make the array more efficient. Placing the elements (shown with circles) farther apart down-samples the quadratic phase function.

Figure 18:
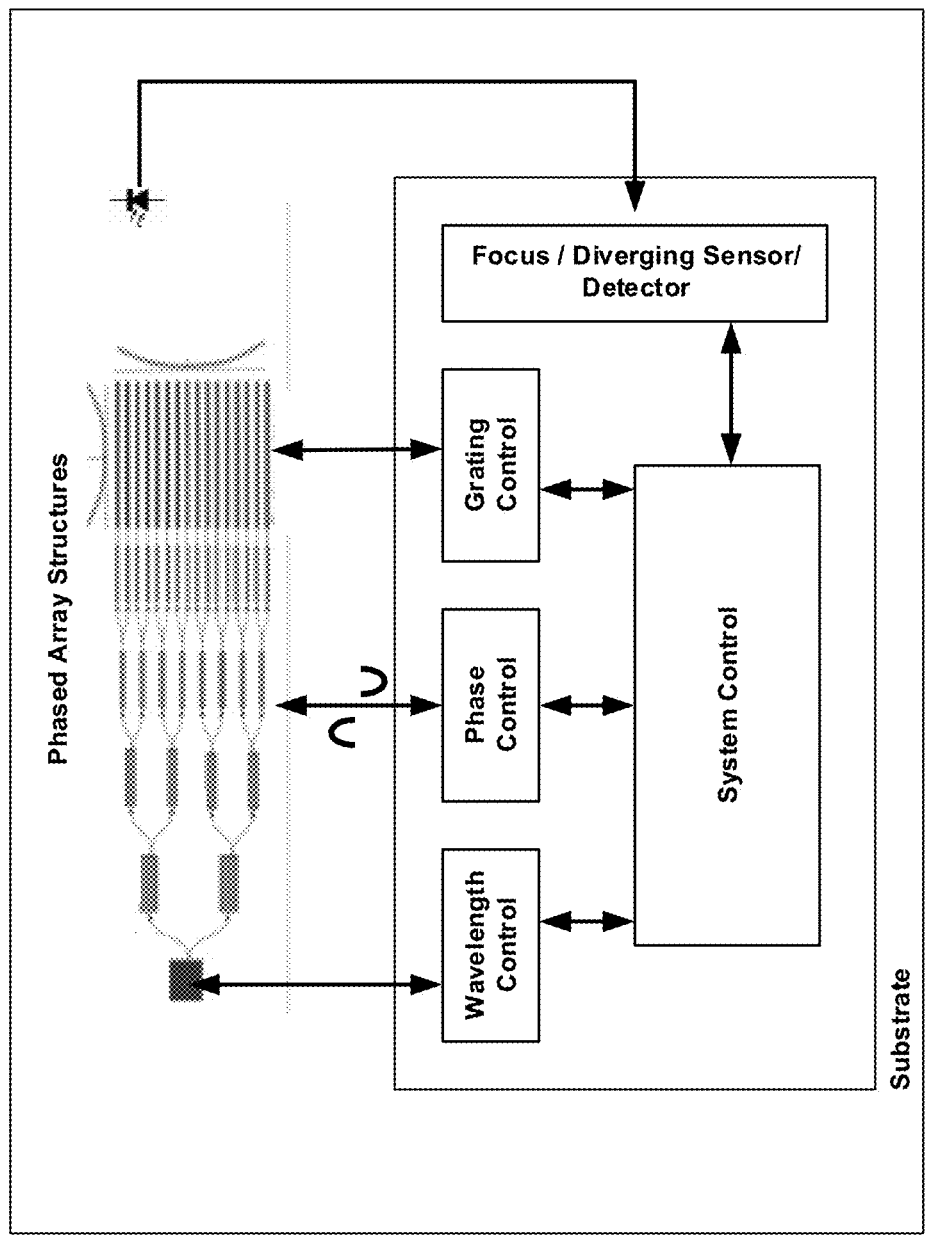
FIG. 18 is a schematic showing an illustrative system including a controllable phased array and illustrative components according to aspects of the present disclosure.

FIG. 18 is a schematic showing the overall architecture and/or operation of an illustrative system constructed according to aspects of the present disclosure. As may be observed from that figure, phased array structures such as those previously described are under control of a system (that may be further included in a larger system) that may provide wavelength control, phase control, and grating control to provide the desired shape/focus/divergence of emissions from the phased array. Feedback is provided to the control system by monitoring the emissions of the phase array and selectively controlling one or more of the separate control functions shown in the figure.

Figure 19:
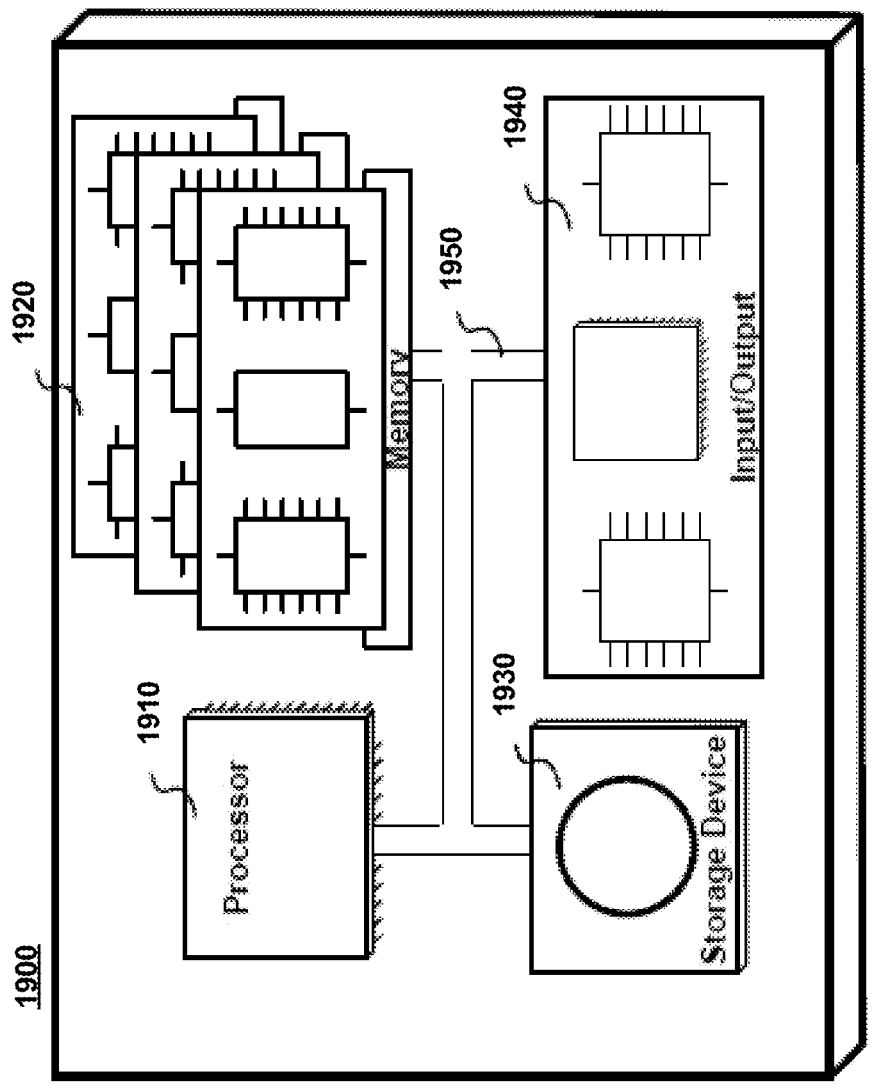
FIG. 19 is an illustrative computer system useful for executing methods according to the present disclosure.

Finally, FIG. 19 shows an illustrative computer system 1900 suitable for implementing methods and systems according to an aspect of the present disclosure and that may serve as illustrative system controller of FIG. 18. As may be immediately appreciated, such a computer system may be integrated into another system and may be implemented via discrete elements or one or more integrated components. The computer system may comprise, for example a computer running any of a number of operating systems. The above-described methods of the present disclosure may be implemented on the computer system 1900 as stored program control instructions.

Computer system 1900 includes processor 1910, memory 1920, storage device 1930, and input/output structure 1940. One or more input/output devices may include a display 1945. One or more busses 1950 typically interconnect the components, 1910, 1920, 1930, and 1940. Processor 1910 may be a single or multi core. Additionally, the system may include accelerators etc. further comprising the system on a chip.

Processor 1910 executes instructions in which embodiments of the present disclosure may comprise operational steps described including the detection of phased array output, application of function(s) across phase shifters to vary any focus spot, adjusting grating pitch, and/or adjusting output wavelength from the source. Such instructions may be stored in memory 1920 or storage device 1930. Data and/or information may be received and output using one or more input/output devices.

Memory 1920 may store data and may be a computer-readable medium, such as volatile or non-volatile memory. Storage device 1930 may provide storage for system 1900 including for example, the previously described operations. In various aspects, storage device 1930 may be a flash memory device, a disk drive, an optical disk device, or a tape device employing magnetic, optical, or other recording technologies.

Input/output structures 1940 may provide input/output operations for system 1900 and provide structures and protocols via which computer system interacts with larger systems and components.

Those skilled in the art will at this juncture appreciate that while we have shown and described our inventive operation as generating a focal point or spot, our disclosure and structures and methods are not so limited. More particularly, systems methods and structures according to the present disclosure may generate any shape, or an arbitratily shaped illumination pattern, so that any pattern on an arbitration plane could be one or two spots with maximum intensity and arbitrary phase for each one. Such patterns may even be square, or other rectangular shape.

Figure 20:
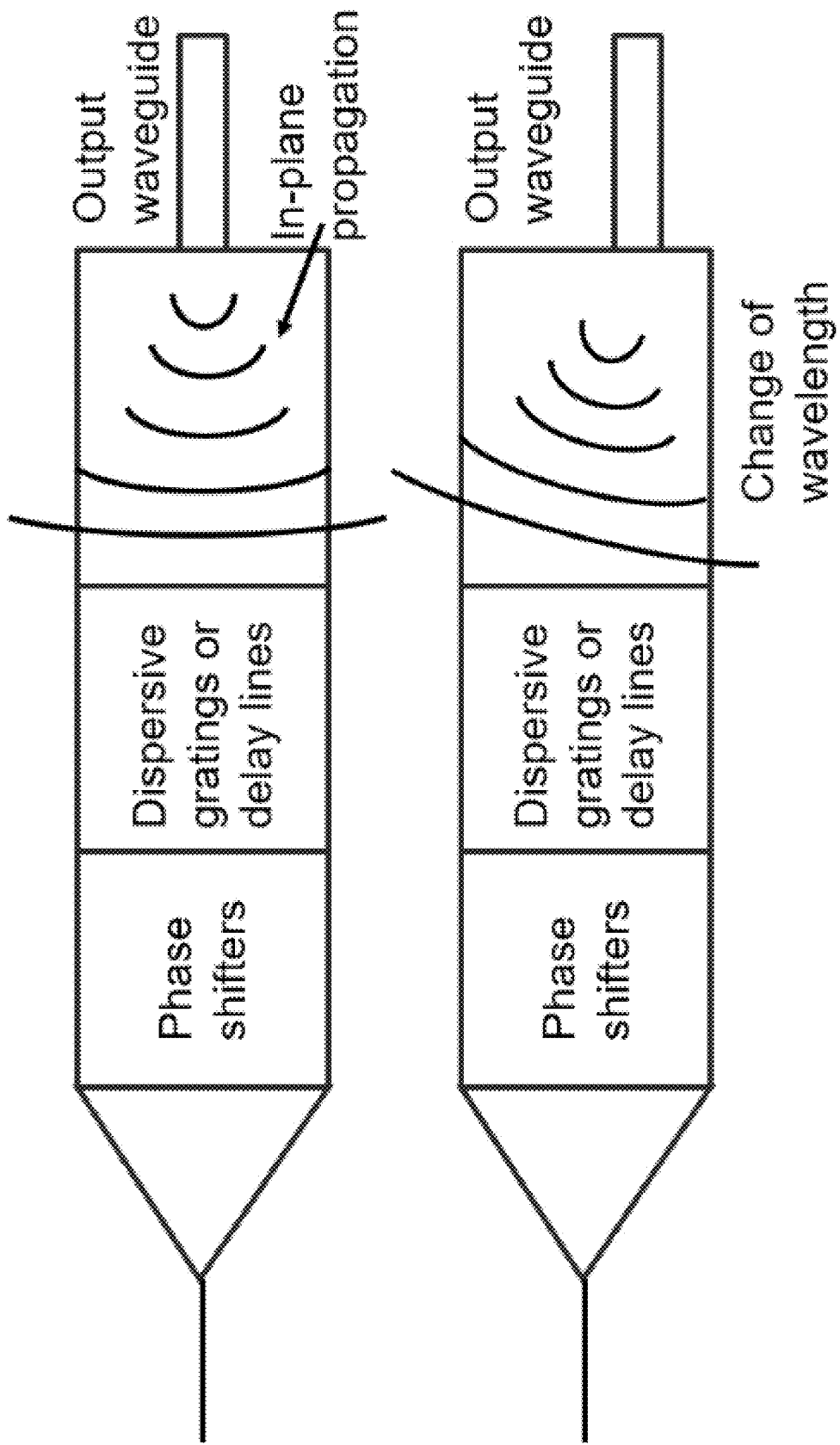
FIG. 20 is a schematic of an illustrative integrated phased array including phase shifters, dispersive gratings and/or delay lines showing the effect of change of wavelength and in-plane propagation according to aspects of the present disclosure.

Note further that one can also adjust the amplitude as well as the phase such that the amplitude of the field emitting from each element may be nonuniform—for example—gaussian across the array. As shown illustratively in FIG. 20, it may be observed that systems, methods and structures according to the present disclosure may advantageously be integrated on one or more substrates or substructures as appropriate and desired. Shown further in that figure it may be observed that in-plane propagation may affect the shape fo the phase front while change in grating—or wavelength of light traversing same—may shift or alter the out of plane direction of the emissions. Accordingly, if a spot is generated at a given focal point it may be moved in-plane our out of plane by phase and grating adjustment as desired.

Figure 21:
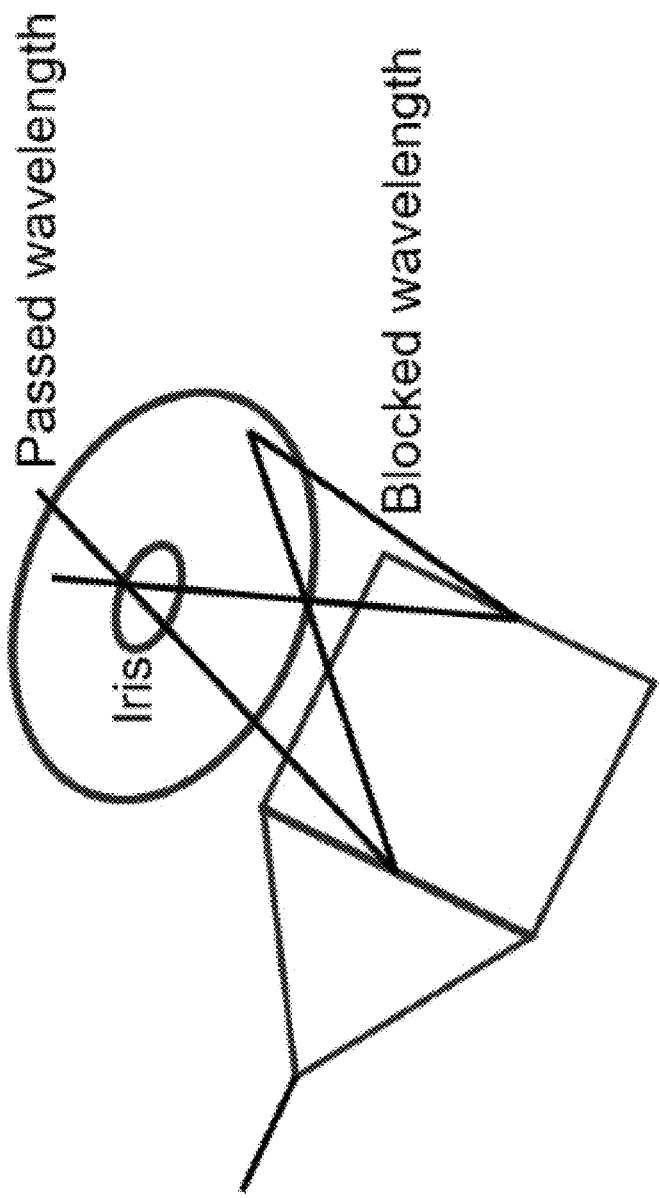
FIG. 21 is a schematic of an illustrative integrated spatial filter and phased array emission according to aspects of the present disclosure.

Finally, FIG. 21 shows in schematic form an illustrative "filter" according to aspects of the present disclosure wherein an iris or other aperture is employed to selectively provide spatial filtering to emissions. As illustratively shown, particular wavelength(s) may be spatially adjusted according to the present disclosure such that selected portion(s) of those wavelengths will pass through the iris, while others are blocked. In this manner, a spatial filter is formed.

At this point, while we have presented this disclosure using some specific examples, those skilled in the art will recognize that our teachings are not so limited. Accordingly, this disclosure should be only limited by the scope of the claims attached hereto.

The invention claimed is:

1. A optical structure comprising:
   an optical source that generates light;
   an array of phase-controlled emitters that phase-control and emit the generated light; and
   an optical distribution network optically connecting the optical source to the array of phase-controlled emitters;
   wherein the phase-controlled emitters include phase shifters having different effective optical path lengths based on effective refractive indices, where the effective optical path lengths are configured to at least partially determine a distribution of delays imposed upon different portions of the generated light, and the distribution of delays is configured such that the emitted light has a phase front that exhibits a substantially focusing or diverging shape.

2. The optical structure of claim 1 wherein the phase front is substantially hyperbolic in shape.

3. The optical structure of claim 2 wherein the hyperbolic phase front exhibits a positive hyperbolic (convex) shape.

4. The optical structure of claim 2 wherein the hyperbolic phase front exhibits a negative hyperbolic (concave) shape.

5. The optical structure of claim 2 wherein the hyperbolic phase front is substantially focused onto a focal point at a distance from the emitter array.

6. The optical structure of claim 5, further comprising an array of grating emitters configured to translate the phase front focused onto the focal point such that the focal point in a direction out-of-plane relative to the phase front.

7. The optical structure according to claim 2 wherein the predetermined distribution of delays is configured such that the phase front is substantially hyperbolic in shape.

8. The optical structure of claim 1 further comprising an array of grating emitters configured such that the phase front is translated in an out-of-plane direction relative to the array of phase-controlled emitters.

9. The optical structure of claim 1 further comprising an array of grating emitters configured to generate a phase front substantially perpendicular to the phase front, said perpendicular phase front exhibiting a substantially non-linear shape.

10. The optical structure of claim 9 wherein the perpendicular non-linear phase front exhibits a substantially hyperbolic shape.

11. The optical structure according to claim 9 wherein the grating period changes along the grating.

12. The optical structure according to claim 1 further comprising an iris positioned after the emitters and configured to spatially filter the phase front.

13. The optical structure according to claim 1 wherein the phase front is defined by a function selected from the group consisting of: piecewise, conical, and Bessel functions.

14. The optical structure according to claim 1 wherein the array of phase-controlled emitters comprise an array of grating emitters configured to emit the generated light, wherein at least one grating of the grating emitters has a period that changes along the grating.

15. A method of operating an optical structure, the optical structure comprising:
   an optical source that generates light;
   an array of phase-controlled emitters that emit the generated light, wherein the phase-controlled emitters include phase shifters having different effective optical path lengths based on effective refractive indices, where the effective optical path lengths are configured to at least partially determine a distribution of delays; and
   an optical distribution network optically connecting the optical source to the array of phase-controlled emitters;
   the method comprising:
   operating the array of phase-controlled emitters such that the distribution of delays is imposed upon different portions of the generated light, wherein the distribution of delays is configured such that the emitted light has a phase front that exhibits a substantially focusing or diverging shape.

16. The method of claim 15 further comprising:
operating the array of phase-controlled emitters such that the travel time from the source to a single common focal point is substantially the same for all emitted light.

17. The method according to claim 15 further comprising:
operating the array of phase-controlled emitters such that the effective refractive index of one or more of the phase shifters is modulated contribute to the distribution of delays.

18. The method according to claim 15 further comprising:
operating the array of phase-controlled emitters such that the light emitted from the emitters is substantially focused onto a single focal point.

19. The method according to claim 15 further comprising:
operating the array of phase-controlled emitters such that the light emitted from the emitters is substantially focused onto a plurality of focal points.

20. The method according to claim 15 further comprising:
operating an array of grating emitters in optical communication with the distribution network and the phase-controlled emitters, such that the phase front is translated in a direction out of plane.

21. The method according to claim 20 further comprising:
configuring the array of grating emitters such that a pitch of the grating varies over its length.

22. The method according to claim 21 further comprising:
configuring the array of grating emitters such that the pitch of the grating is longest at a near end and shortest at a far end.

23. The method according to claim 15 wherein the predetermined distribution of delays is configured such that the phase front is substantially hyperbolic in shape.

24. A optical structure comprising:
an optical source that generates light; and
an array of phase-controlled emitters that phase-control and emit the generated light, wherein the emitted light has a phase front that exhibits a substantially focusing or diverging shape;
an optical distribution network optically connecting the optical source to the array of phase-controlled emitters; and
an iris positioned after the emitters and configured to spatially filter the phase front.

* * * * *